United States Patent
Leggette et al.

(10) Patent No.: US 10,481,833 B2
(45) Date of Patent: Nov. 19, 2019

(54) TRANSFERRING DATA ENCODING FUNCTIONS IN A DISTRIBUTED STORAGE NETWORK

(71) Applicant: International Business Machines Corporation, Armonk, NY (US)

(72) Inventors: Wesley B. Leggette, Chicago, IL (US); Ravi V. Khadiwala, Bartlett, IL (US); Bruno Hennig Cabral, Chicago, IL (US); Jason K. Resch, Chicago, IL (US)

(73) Assignee: PURE STORAGE, INC., Mountain View, CA (US)

( * ) Notice: Subject to any disclaimer, the term of this patent is extended or adjusted under 35 U.S.C. 154(b) by 0 days.

(21) Appl. No.: 15/850,127

(22) Filed: Dec. 21, 2017

(65) Prior Publication Data
US 2018/0113651 A1 Apr. 26, 2018

Related U.S. Application Data

(63) Continuation-in-part of application No. 15/848,137, filed on Dec. 20, 2017, which is a
(Continued)

(51) Int. Cl.
*G06F 11/10* (2006.01)
*G06F 3/06* (2006.01)

(52) U.S. Cl.
CPC ............ *G06F 3/0659* (2013.01); *G06F 3/064* (2013.01); *G06F 3/065* (2013.01); *G06F 3/067* (2013.01);
(Continued)

(58) Field of Classification Search
CPC .................................................. G06F 11/1076
(Continued)

(56) References Cited

U.S. PATENT DOCUMENTS 4,092,732 A 5/1978 Ouchi
5,454,101 A 9/1995 Mackay et al.
(Continued)

OTHER PUBLICATIONS

Chung; An Automatic Data Segmentation Method for 3D Measured Data Points; National Taiwan University; pp. 1-8; 1998.
(Continued)

*Primary Examiner* — Fritz Alphonse
(74) *Attorney, Agent, or Firm* — Garlick & Markison; Timothy W. Markison; Bruce E. Stuckman

(57) ABSTRACT

A method for transferring data encoding begins by receiving a data access request to access a data object that is based on a set of encoded data slices (EDSs) that is distributedly stored among a plurality of storage units (SUs) associated with a plurality of storage sites, and continues with a computing device selecting respective numbers of SUs at each of the plurality of storage sites to support the data access request. The method continues with the computing device selecting another computing device that is associated with a storage site of the plurality of storage sites to process the data access request, based on the respective numbers of SUs at each of the plurality of storage sites. The method continues with the computing device transmitting the data access request to the another computing device to for processing.

19 Claims, 20 Drawing Sheets

Related U.S. Application Data continuation-in-part of application No. 14/847,855, filed on Sep. 8, 2015, now Pat. No. 9,916,114.

(60) Provisional application No. 62/072,123, filed on Oct. 29, 2014.

(52) U.S. Cl.
CPC ........ *G06F 3/0619* (2013.01); *G06F 11/1076* (2013.01)

(58) Field of Classification Search
USPC ...................................................... 714/764
See application file for complete search history.

(56) References Cited

U.S. PATENT DOCUMENTS

| | | | |
|---|---|---|---|
| 5,485,474 | A | 1/1996 | Rabin |
| 5,774,643 | A | 6/1998 | Lubbers et al. |
| 5,802,364 | A | 9/1998 | Senator et al. |
| 5,809,285 | A | 9/1998 | Hilland |
| 5,890,156 | A | 3/1999 | Rekieta et al. |
| 5,987,622 | A | 11/1999 | Lo Verso et al. |
| 5,991,414 | A | 11/1999 | Garay et al. |
| 6,012,159 | A | 1/2000 | Fischer et al. |
| 6,058,454 | A | 5/2000 | Gerlach et al. |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,636,724 | B2 | 12/2009 | de la Torre et al. |
| 8,924,681 | B1 | 12/2014 | Throop et al. |
| 9,244,152 | B1 | 1/2016 | Thiagarajan |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula |
| 2005/0132070 | A1 | 6/2005 | Redlich et al. |
| 2005/0144382 | A1 | 6/2005 | Schmisseur |
| 2005/0229069 | A1 | 10/2005 | Hassner et al. |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0283167 | A1 | 12/2007 | Venters et al. |
| 2008/0243783 | A1 | 10/2008 | Santi et al. |
| 2009/0089149 | A1 | 4/2009 | Lerner et al. |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |
| 2012/0117351 | A1 | 5/2012 | Motwani et al. |
| 2012/0131584 | A1 | 5/2012 | Raevsky |
| 2012/0167108 | A1 | 6/2012 | Bowers et al. |
| 2014/0177476 | A1 | 6/2014 | Perrett |
| 2015/0067421 | A1 | 3/2015 | Baptist et al. |
| 2015/0378616 | A1 | 12/2015 | Khadiwala et al. |
| 2015/0378626 | A1 | 12/2015 | Motwani et al. |
| 2015/0378822 | A1 | 12/2015 | Grube et al. |
| 2015/0381730 | A1 | 12/2015 | Resch et al. |
| 2015/0381731 | A1 | 12/2015 | Grube et al. |
| 2016/0179618 | A1 | 6/2016 | Resch et al. |
| 2016/0188253 | A1 | 6/2016 | Resch et al. |
| 2016/0226522 | A1 | 8/2016 | Resch et al. |
| 2016/0255150 | A1 | 9/2016 | Dhuse et al. |
| 2016/0292254 | A1 | 10/2016 | Dhuse et al. |
| 2016/0294949 | A1 | 10/2016 | Motwani et al. |
| 2016/0306699 | A1 | 10/2016 | Resch et al. |
| 2016/0378350 | A1 | 12/2016 | Motwani et al. |
| 2017/0123920 | A1* | 5/2017 | Dhuse ................ G06F 11/1092 |
| 2017/0168720 | A1 | 6/2017 | Kazi et al. |
| 2017/0168749 | A1 | 6/2017 | Grube et al. |
| 2017/0177228 | A1 | 6/2017 | Baptist et al. |
| 2017/0300259 | A1* | 10/2017 | Cilfone ................ G06F 3/0608 |
| 2017/0364972 | A1* | 12/2017 | Volvovski ............. G06Q 30/04 |
| 2018/0102874 | A1* | 4/2018 | Resch .................. H04L 1/0061 |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

(56) References Cited

OTHER PUBLICATIONS

Smith; Lightweight Directory Access Protocol (LDAP): Uniform Resource Locator; IETF Network Working Group; RFC 4516; Jun. 2006; pp. 1-15.
Smith; Lightweight Directory Access Protocol (LDAP): String Representation of Search Filters; IETF Network Working Group; RFC 4515; Jun. 2006; pp. 1-12.
Wildi; Java iSCSi Initiator; Master Thesis; Department of Computer and Information Science, University of Konstanz; Feb. 2007; 60 pgs.
Xin, et al.; Evaluation of Distributed Recovery in Large-Scale Storage Systems; 13th IEEE International Symposium on High Performance Distributed Computing; Jun. 2004; pp. 172-181.
Zeilenga; Lightweight Directory Access Protocol (LDAP): Technical Specification Road Map; IETF Network Working Group; RFC 4510; Jun. 2006; pp. 1-8.
Zeilenga; Lightweight Directory Access Protocol (LDAP): String Representation of Distinguished Names; IETF Network Working Group; RFC 4514; Jun. 2006; pp. 1-15.
Zeilenga; Lightweight Directory Access Protocol (LDAP): Internationalized String Preparation; IETF Network Working Group; RFC 4518; Jun. 2006; pp. 1-14.
Zeilenga; Lightweight Directory Access Protocol (LDAP): Directory Information Models; IETF Network Working Group; RFC 4512; Jun. 2006; pp. 1-49.

* cited by examiner

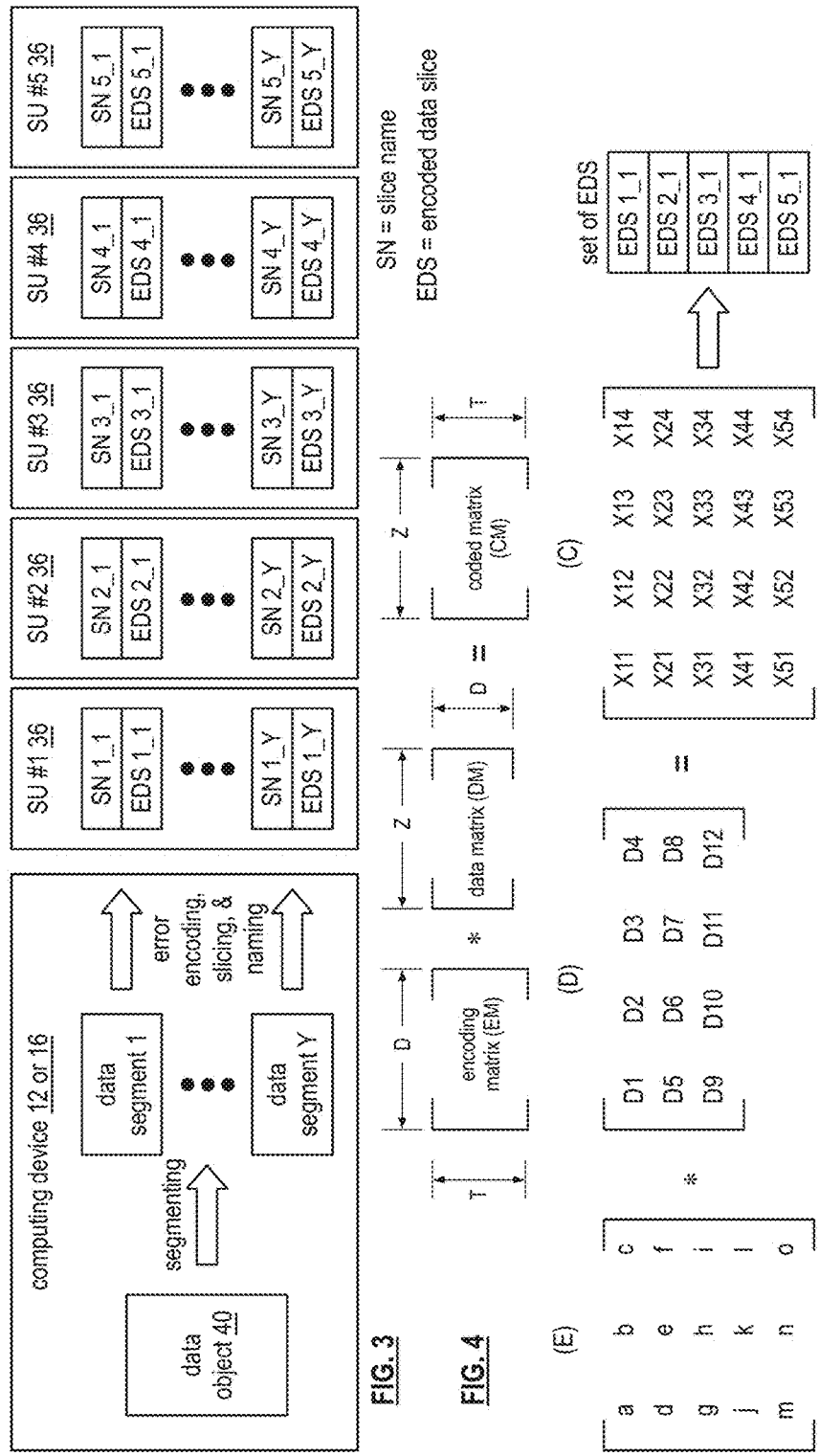

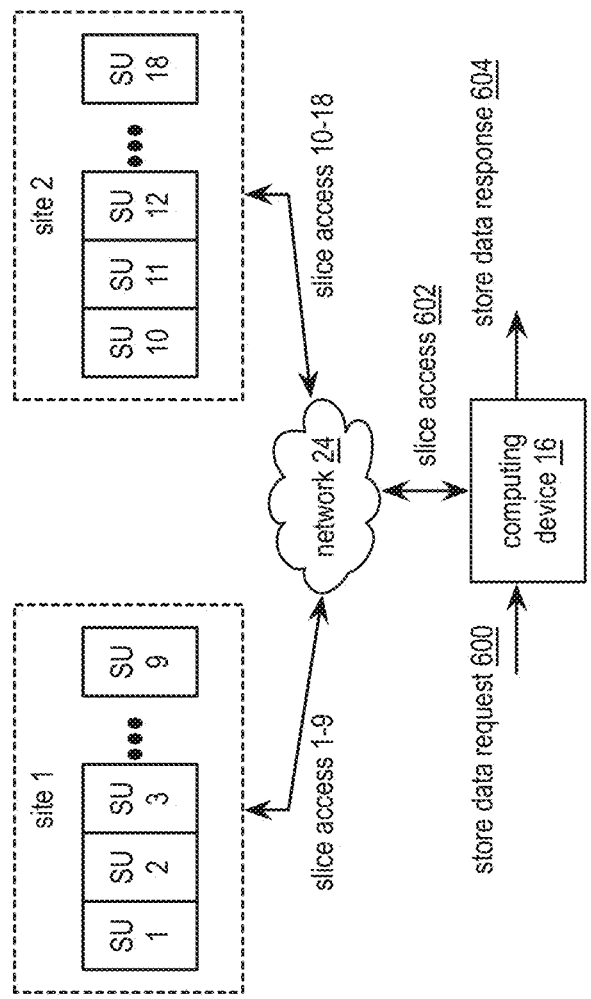

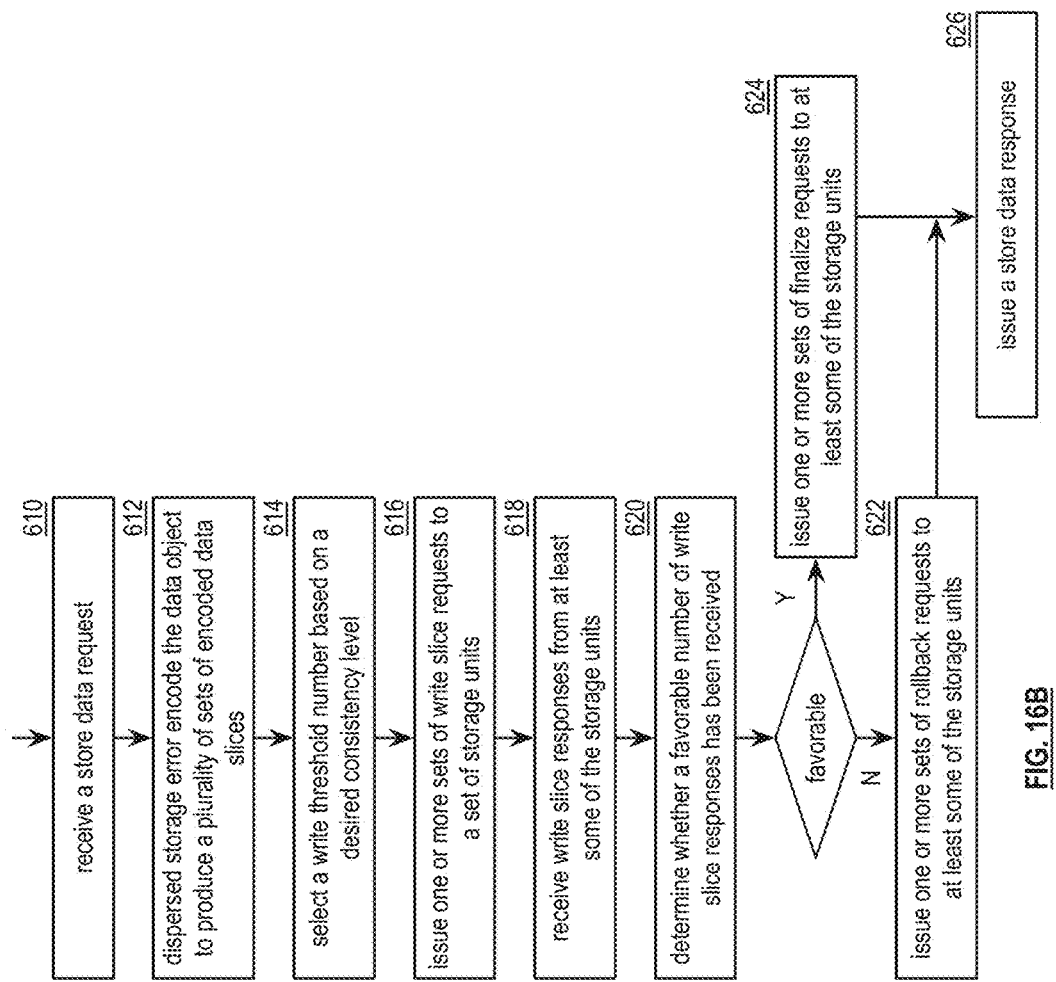

US 10,481,833 B2

TRANSFERRING DATA ENCODING FUNCTIONS IN A DISTRIBUTED STORAGE NETWORK

CROSS REFERENCE TO RELATED PATENTS

The present U.S. Utility patent application claims priority pursuant to 35 U.S.C. § 120 as a continuation-in-part of U.S. Utility application Ser. No. 15/848,137, entitled "OVERDRIVE mode FOR DISTRIBUTED STORAGE NETWORKS", filed, Dec. 20, 2017, which is a continuation-in-part of U.S. Utility application Ser. No. 14/847,855, entitled "DETERMINISTICALLY SHARING A PLURALITY OF PROCESSING RESOURCES", filed Sep. 8, 2015, which claims priority pursuant to 35 U.S.C. § 119(e) to U.S. Provisional Application No. 62/072,123, entitled "ASSIGNING TASK EXECUTION RESOURCES IN A DISPERSED STORAGE NETWORK," filed Oct. 29, 2014, all of which are hereby incorporated herein by reference in their entirety and made part of the present U.S. Utility patent application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersed storage of data and distributed task processing of data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc., on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

FIG. 16A is a schematic block diagram of another embodiment of a dispersed storage network (DSN) in accordance with the present invention; and FIG. 16B is a flowchart illustrating another example of storing data in accordance with the present invention.

DETAILED DESCRIPTION OF THE INVENTION

Figure 1:
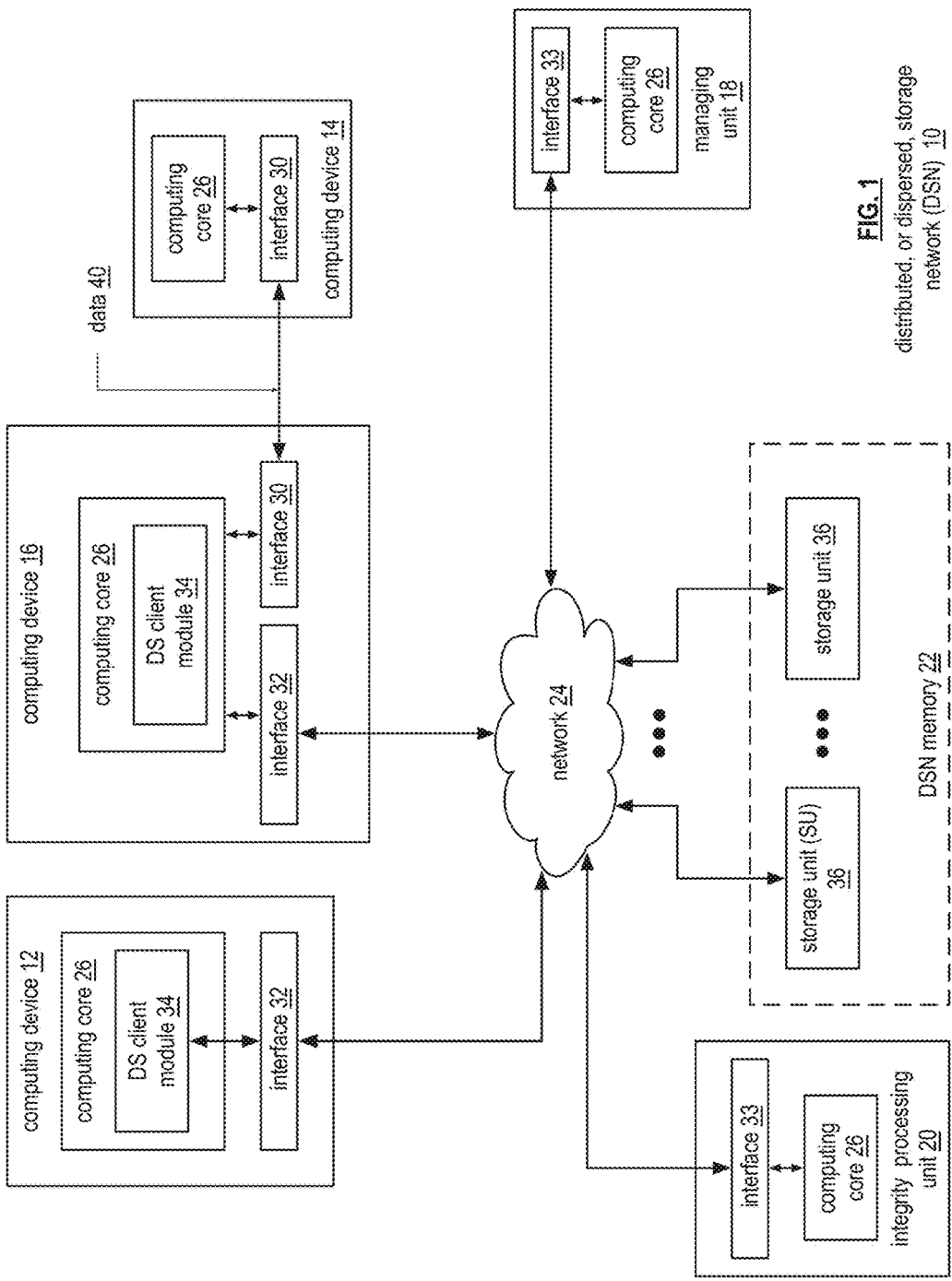
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
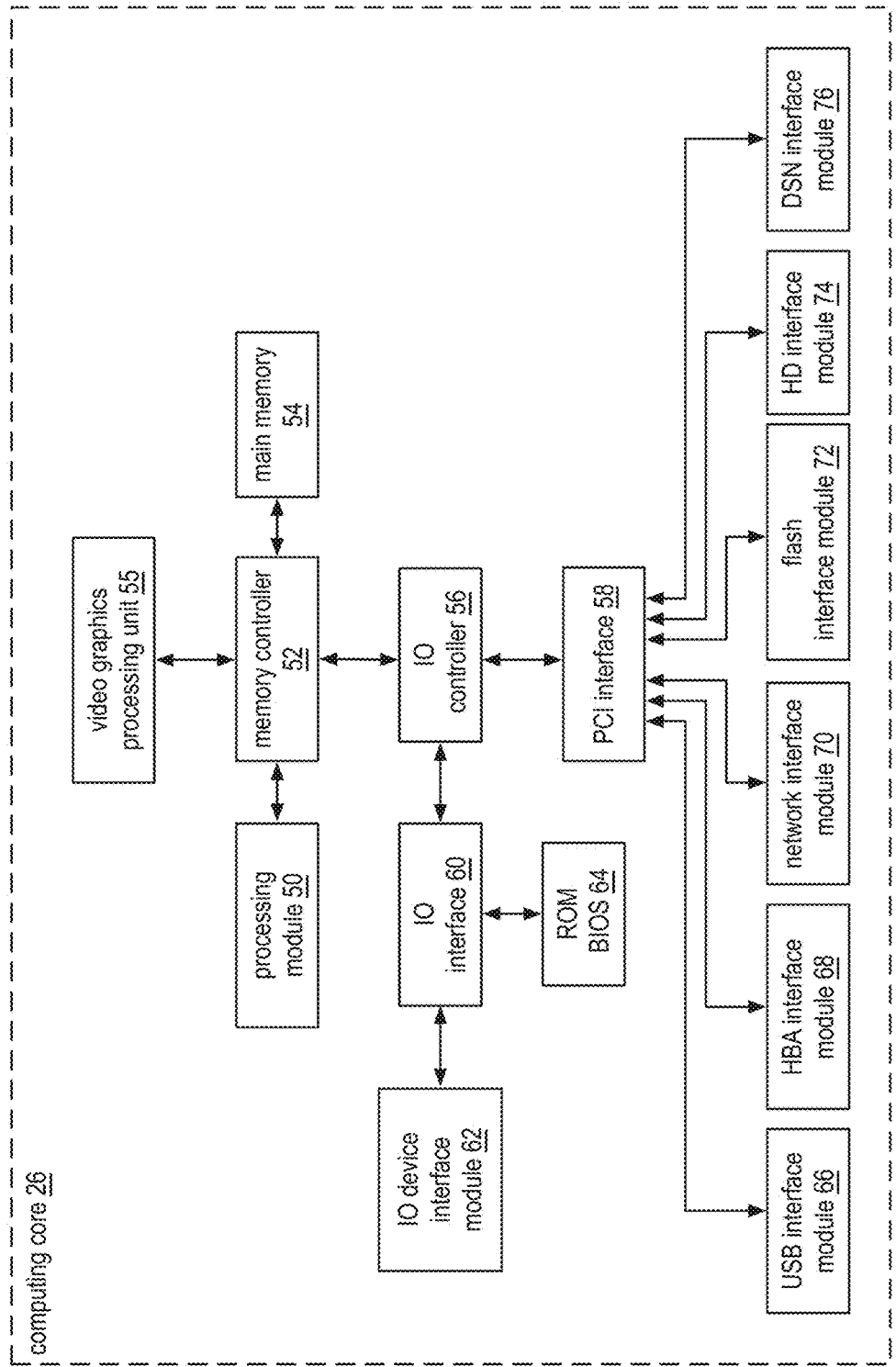
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 and 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data (e.g., data 40) as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The managing unit 18 creates billing information for a particular user, a user group, a vault access, public vault access, etc. For instance, the managing unit 18 tracks the number of times a user accesses a non-public vault and/or public vaults, which can be used to generate a per-access billing information. In another instance, the managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment (i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
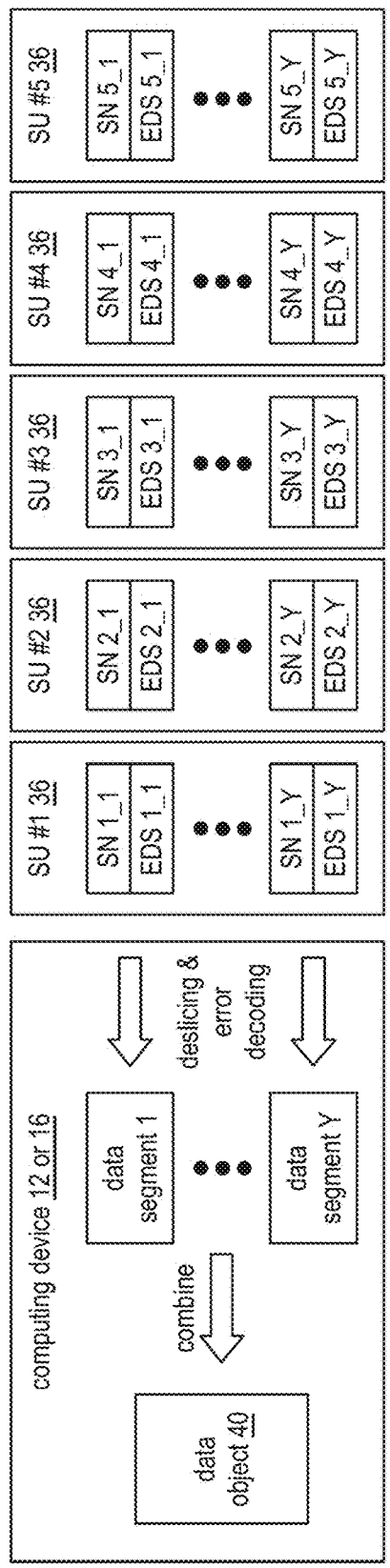
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
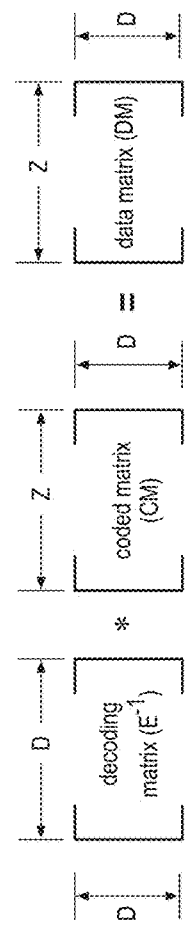
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9A:
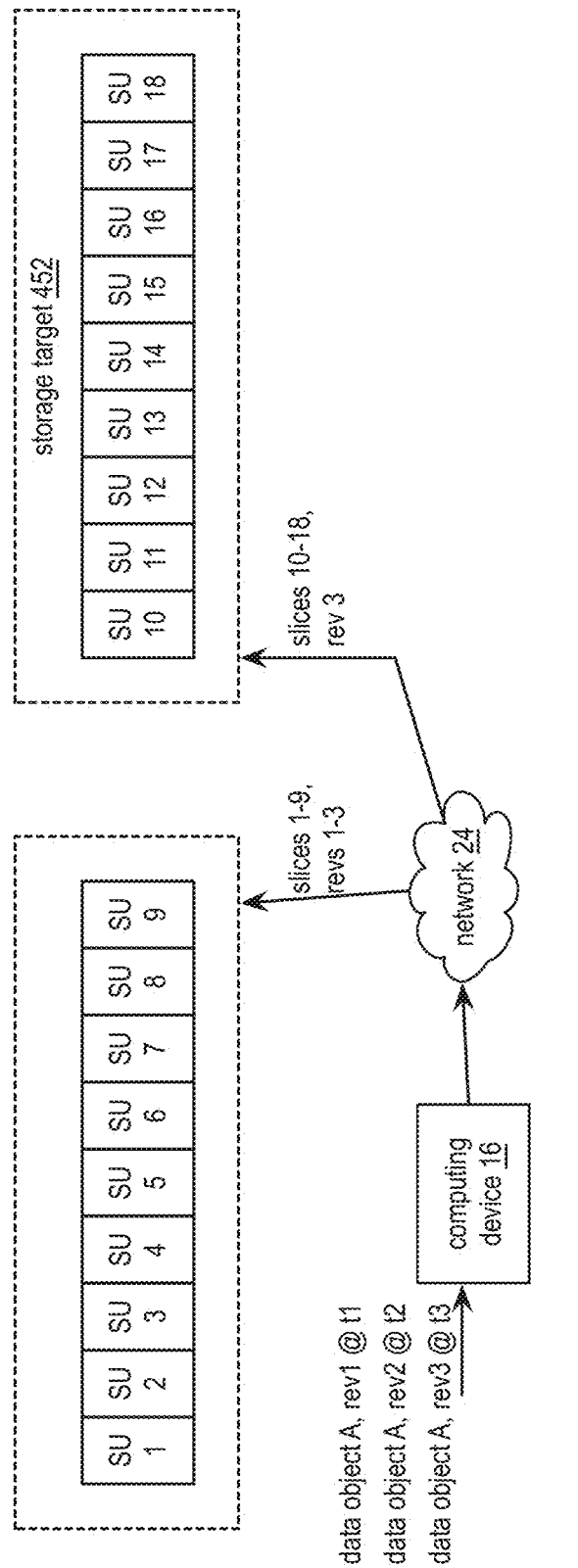
FIG. 9A is a schematic block diagram of another embodiment of a dispersed storage network (DSN) in accordance with the present invention.

FIG. 9A is a schematic block diagram of another embodiment of a dispersed storage network (DSN) that includes a fast storage target 450, a storage target 452, the network 24 of FIG. 1, and the distributed storage (DS) processing unit 16 of FIG. 1. The fast storage target 450 includes a first group of storage units and the storage target 452 includes a second group of storage units. Each storage unit may be implemented utilizing the storage units 36 of FIG. 1. Together, the storage units of the fast storage target 450 and the storage target 452 combine to form an information dispersal algorithm (IDA) width number of storage units as a set of storage units for storage of sets of encoded data slices, where the IDA width is greater than or equal to twice a decode threshold associated with the IDA (e.g., a so-called eventual consistency configuration). Each of the fast storage target 450 and the storage target 452 include at least a decode threshold number of storage units. The fast storage target 450 and storage target 452 may be implemented at different sites of the DSN.

The DSN is operable to store data in the storage units as sets of encoded data slices. In an example of operation of the storing of the data, the computing device 16 receives one or more revisions of the data object for storage within a time frame. For example, the computing device 16 receives a first revision of a data object A at time 1, receives a second revision of the data object A at time 2, and receives a third revision of the data object A at time 3. The receiving may further include receiving a data identifier of the data object and a revision identifier associated with the revision of the data object.

Having received a revision of the data object, the computing device 16 selects a primary storage target from a plurality of storage targets. The selecting may be based on one or more of performance levels of storage units of the storage targets. For example, the computing device 16 selects the fast storage target 450 when storage units of the fast storage target are associated with improved performance levels (e.g., higher sustained bandwidth of access, lower access latency times, etc.) as compared to storage units of the storage target.

For each of the revisions, the computing device 16 facilitates storage of the revision of the data object in the selected primary storage target. For example, the computing device 16 dispersed storage error encodes the revision of the data object to produce a plurality of sets of encoded data slices, and sends, for each set of encoded data slices, at least some of the encoded data slices to storage units of the selected primary storage target. For instance, the computing device 16 produces the plurality of sets of encoded data slices to include 18 encoded data slices in each set and sends, via the network 24, encoded data slices 1-9 of each of the plurality of sets of encoded data slices of the revision to the storage units 1-9 of the fast storage target for storage.

For each of the revisions, the computing device 16 facilitates subsequent storage of remaining encoded data slices of each set of encoded data slices. The facilitating includes temporarily storing the remaining encoded data slices in a memory of the computing device 16. Having facilitated the subsequent storage, the computing device 16 determines whether to store encoded data slices in another storage target. computing device 16 indicates to store the encoded data slices in the other storage target based on one or more of when a timeframe expires without receiving another revision of the data object, in accordance with a schedule, based on a number of temporarily stored revisions matching a maximum number of revisions for temporary storage, and receiving a request. For example, the computing device 16 determines to store encoded data slices of revision 3 in the storage target when the maximum number of revisions for temporary storage is three.

When storing encoded data slices in the other storage target, the computing device 16 identifies a most recently stored revision of the data object. The identifying includes at least one of performing a lookup, initiating a query, and interpreting a query response. For example, the computing device 16 accesses the memory of the computing device 16 and determines that revision 3 of the data object A is the most recently stored revision.

Having identified the most recently stored revision of the data object, the computing device 16 facilitates storage of the remaining encoded data slices of each set of encoded data slices associated with the most recently stored revision and the data object in storage units of the other storage target. For example, the computing device 16 issues, via the network 24, write slice requests to storage units 10-18 of the storage target, where the write slice requests includes the remaining encoded data slices of each of the set of encoded data slices associated with revision 3 of the data object.

Figure 9B:
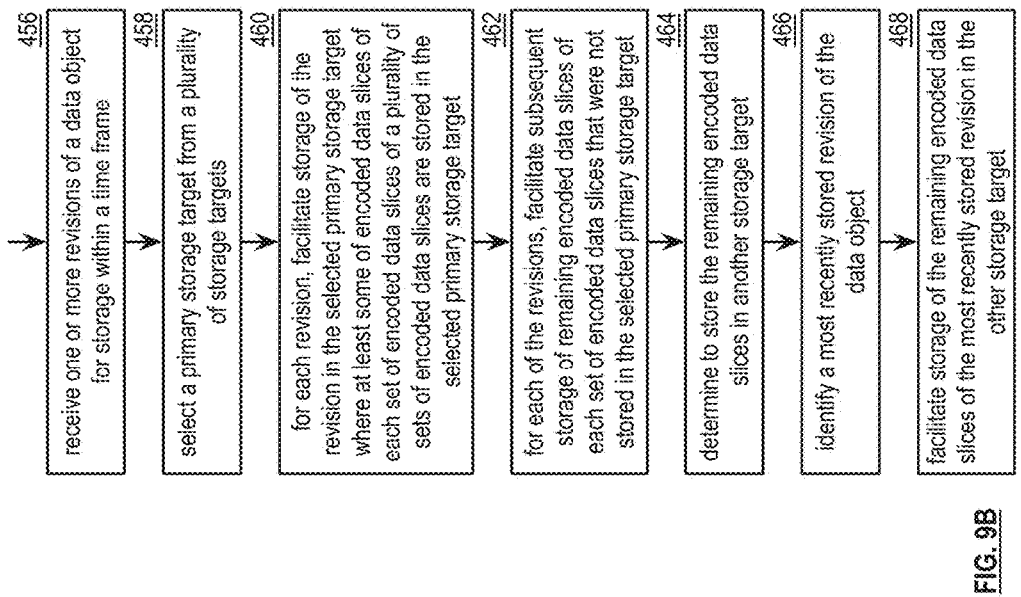
FIG. 9B is a flowchart illustrating an example of storing data in accordance with the present invention.

FIG. 9B is a flowchart illustrating an example of storing data. The method begins or continues at step 456 where a processing module (e.g., of a distributed storage (DS) client unit) receives one or more revisions of a data object for storage within a time frame. The receiving may further include receiving a revision identifier for each revision. The method continues at step 458 where the processing module selects a primary storage target from a plurality of storage targets. The selecting may be based on identifying a storage target associated with a favorable performance level (e.g., best performance, performance greater than a minimum performance threshold level) as the primary storage target.

For each revision, the method continues at step 460 where the processing module facilitates storage of the revision in the selected primary storage target where at least some of the encoded data slices of each set of encoded data slices of a plurality of sets of encoded data slices are stored in the selected primary storage target. For example, the processing module dispersed storage error encodes the revision of the data object to produce a plurality of sets of encoded data slices and for each set, identifies encoded data slices associated with the primary storage target (e.g., slices corresponding to storage units of the primary storage target, where a number of storage units of the primary storage target is greater than or equal to a decode threshold number associated with the dispersed storage error coding), and sends the identified encoded data slices to the storage units of the primary storage target for storage.

For each of the revisions, the method continues at step 462 where the processing module facilitates subsequent storage of remaining encoded data slices of each set of encoded data slices that were not stored in the selected primary storage target. For example, the processing module temporarily stores (e.g., in a local memory) the remaining encoded data slices of each set of encoded data slices, stores the revision indicator, and stores the timestamp.

The method continues at step 464 where the processing module determines to store the remaining encoded data slices in another storage target. For example, the processing module indicates to store the remaining encoded data slices when a timeframe expires without receiving another revision of the data object. As another example, the processing module indicates to store the remaining encoded data slices in accordance with a schedule. As yet another example, the processing module indicates to store the remaining encoded data slices when a number of temporarily stored revisions is substantially the same as a maximum number of stored revisions. The determining to store the remaining encoded data slices and the other storage target further includes identifying the other storage target based on at least one of a lookup and performing a query. For example, the processing module identifies the other storage target as a storage target associated with the selected primary storage target.

The method continues at step 466 where the processing module identifies a most recently stored revision of the data object. The identifying includes at least one of interpreting a lookup, issuing a list slice request to a storage unit of the selected primary storage target, and interpreting a list slice response. The method continues at step 468 where the processing module facilitates storage of the remaining encoded data slices of the most recently stored revision in the other storage target. For example, the processing module sends the remaining encoded data slices of each set of encoded data slices of the plurality of sets of encoded data slices associated with the most recently stored revision to storage units of the other storage target.

Figure 10A:
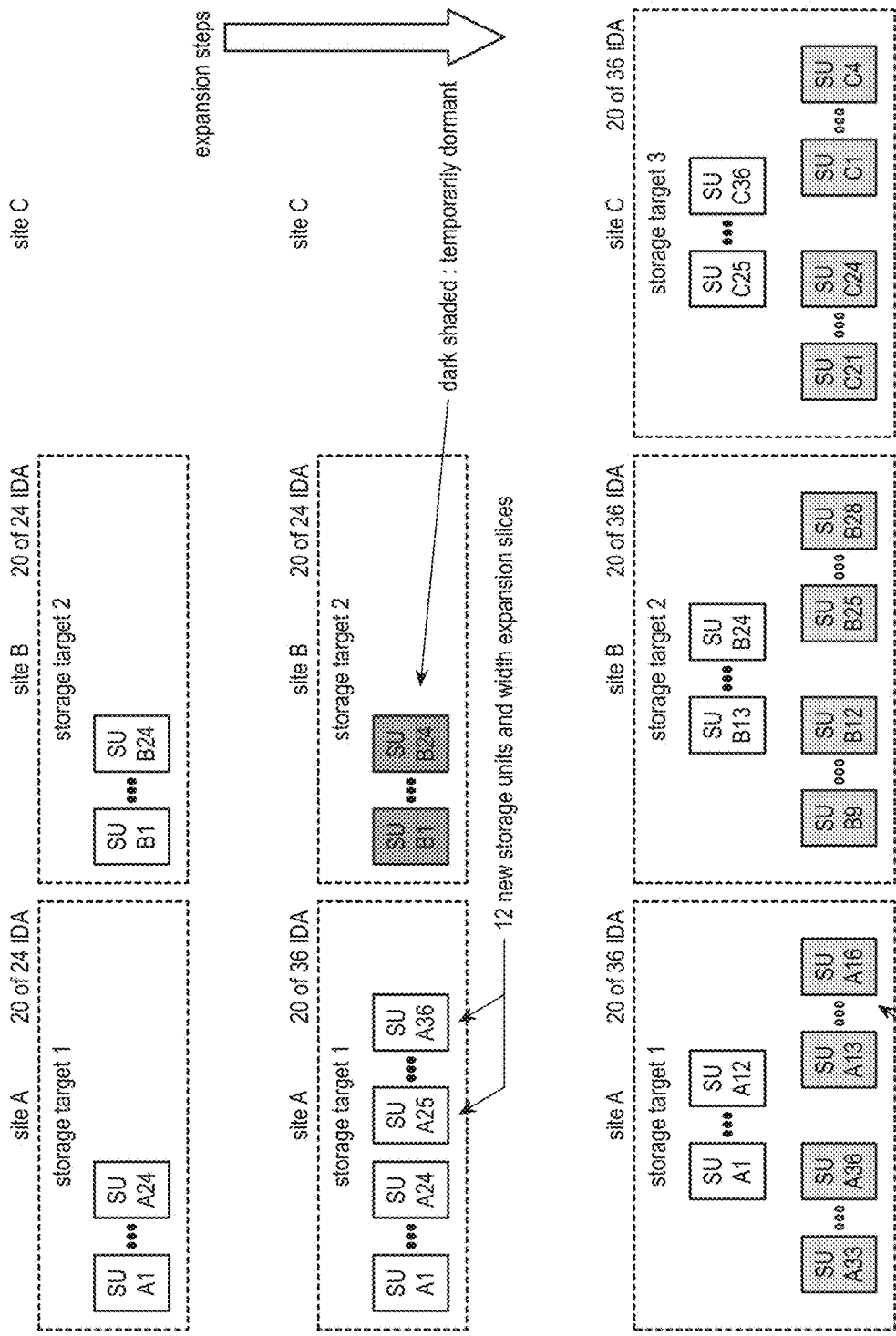
FIG. 10A is a schematic block diagram of another embodiment of a dispersed storage network (DSN) in accordance with the present invention.

FIG. 10A is a schematic block diagram of another embodiment of a dispersed storage network (DSN) that includes two or more storage targets portrayed in a series of expansion steps, where another storage target is created for association with the two or more storage targets of a starting step. Each storage target includes a plurality of storage units. Each storage unit may be implemented utilizing the dispersed storage (DS) execution (EX) unit 36 of FIG. 1.

The DSN is operable to migrate stored data to facilitate expansion of the two or more storage targets. In an example of operation of the migrating of the stored data, the starting step portrays a storage target 1 implemented at a site A and a storage target 2 implemented at a site B. the storage target 1 initially includes storage units A1-A24 and the storage target 2 initially includes storage units B1-B24. Sets of encoded data slices may be generated in accordance with an information dispersal algorithm (IDA), where an IDA width number of encoded data slices included in each set of encoded data slices and a decode threshold number of encoded data slices are required to recover a data segment that was dispersed storage error encoded to produce the set of encoded data slices. For example, a decode threshold of 20 may be associated with each storage target when the IDA width of 24 is utilized. As such, 24 slices are stored in at least 24 storage units of the storage targets 1 and 2 and at least 20 slices are recovered from storage units of the storage targets 1 and 2 to recover a data segment.

In the example of operation of the migrating of the stored data to facilitate the expansion of the two storage targets to three storage targets, in a first step of the expansion steps, the storage units B1-B24 are inactivated to be temporarily dormant within the storage target 2. Having inactivated the storage units of the storage target 2, an expanded IDA width is selected. The selecting may be based on one or more of a predetermination, a desired number of storage units per storage target after the expansion of the storage targets, and a number of storage units present prior to the first step of the expansion steps. For example, an IDA width of 36 is selected to expand the 48 storage units to 60 storage units, where 20 storage units are implemented at each of three sites A, B, and C and at least a decode threshold number (e.g., decode threshold unchanged) of storage units are implemented at each of the sites (e.g., 20). For instance, 60−48=12 new storage units are required to provide storage for 12 additional encoded data slices per set of encoded data slices.

Having selected the expanded IDA width, the 12 new storage units are added to the storage target 1 such that storage target 1 temporarily includes the expanded IDA width number of storage units (e.g., 36). Having implemented the new storage units, expansion encoded data slices 25-36 are generated for each set of stored encoded data slices 1-24 and stored in the 12 new storage units. For instance, a DS client module 34 of FIG. 1 recovers, for each data segment, at least a decode threshold number of encoded data slices from storage units A1-A24, dispersed storage error decodes the recovered encoded data slices to reproduce a data segment, dispersed storage error encodes the reproduced data segment using an expanded encoding matrix to produce the expansion encoded data slices 25-36 for storage in the new storage units A25-A36.

In a second step of the expansion, the storage units at storage target 1 (e.g., storage units A1-A36) are equally divided amongst the three storage targets at the three sites for redeployment. For example, storage units A13-A24 are physically moved to site B and become part of storage target 2 as storage units B13-B24 and new storage units A25-A36 are physically moved to site C and become part of storage target 3 as storage units C25-C36. Encoded data slices 25-36 are still stored within the storage units C25-C36.

Having redeployed the storage units from the storage target 1, the storage units from the storage target 2 are evenly redeployed amongst the three storage targets. For example, eight storage units are deployed at each of the three sites. For instance, storage units B1-B8 are redeployed to storage target 1 and renamed as storage units A33-A36 and storage units A13-A16 such that storage target 1 now includes 20 storage units A33-A16. Having redeployed the storage units, encoded data slices are copied from corresponding storage units of the other storage targets to populate the redeployed storage units with a corresponding encoded data slices. For example, encoded data slices 33-36 are copied from storage units C33-C36 at storage target 3 to populate storage units A33-A36. In a similar fashion, 8 storage units from the original storage units B1-B24 are redeployed and populated with encoded data slices at storage target 2 and at storage target 3.

While moving the storage units of the non-expanded site, the DSN may utilize the expanded set of storage units as a temporary common storage target (e.g., storage units A1-A36). Once all storage units have been redeployed and repopulated with encoded data slices, the three storage targets may perform eventual consistency synchronization operations to maintain at least a decode threshold number of encoded data slices of the storage targets as a first priority and to maintain further encoded data slices of most recent revisions as a second priority.

Figure 10B:
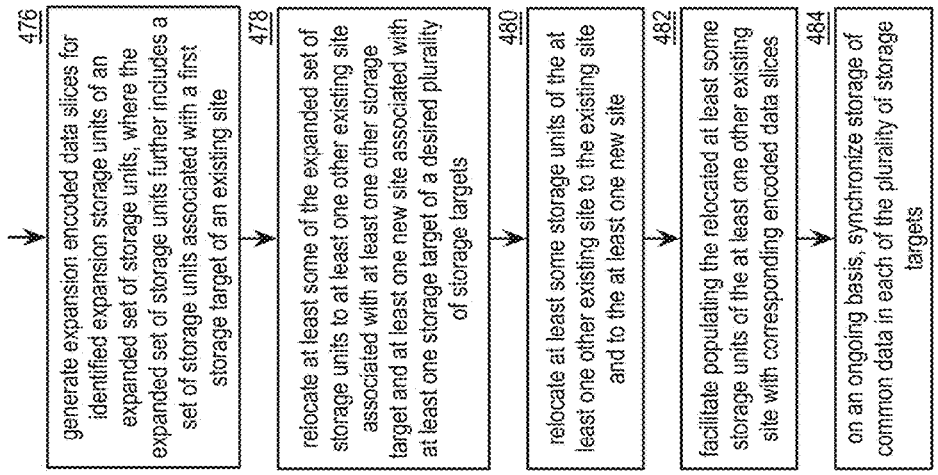
FIG. 10B is a flowchart illustrating an example of migrating stored data in accordance with the present invention.

FIG. 10B is a flowchart illustrating an example of migrating stored data. The method begins or continues at step 476 where a processing module (e.g., of a distributed storage (DS) client module) generates expansion encoded data slices for identified expansion storage units of an expanded set of storage units, where the expanded set of storage units further includes a set of storage units associated with a first storage target of an existing site. For example, for each set of existing stored encoded data slices, the processing module recovers a decode threshold number of slices, dispersed storage error decodes the recovered slices to reproduce a data segment, dispersed storage error encodes the data segment with an expanded encoding matrix to produce the expansion encoded data slices, and facilitate storage of the expansion encoded data slices in the identified expansion storage units.

The method continues at step 478 where the processing module relocates at least some of the expanded set of storage units to at least one other existing site associated with at least one other storage target and at least one new site associated with at least one storage target of a desired plurality of storage targets. For example, the processing module selects at least some of the expanded set of storage units (e.g., equally divides amongst the desired plurality of storage targets) and indicates the selection for re-location keeping stored encoded data slices intact.

The method continues at step 480 where the processing module relocates at least some storage units of the at least one other existing site to the existing site and to the at least one new site. For example, the processing module selects at least some of the storage units and indicates the selection for relocation.

The method continues at step 482 where the processing module facilitates population of the relocated at least some storage units of the at least one other existing site with corresponding encoded data slices. For example, the processing module rebuilds encoded data slices based on decoding at least a decode threshold number of encoded data slices per set of encoded data slices. As another example, the processing module copies encoded data slices from corresponding storage units of the expanded set of storage units.

The method continues at step 484 where, on an ongoing basis, the processing module synchronizes storage of common data in each of the plurality of storage targets. For example, the processing module maintains same revisions of encoded data slices stored in storage units of the plurality of storage targets.

Figure 11A:
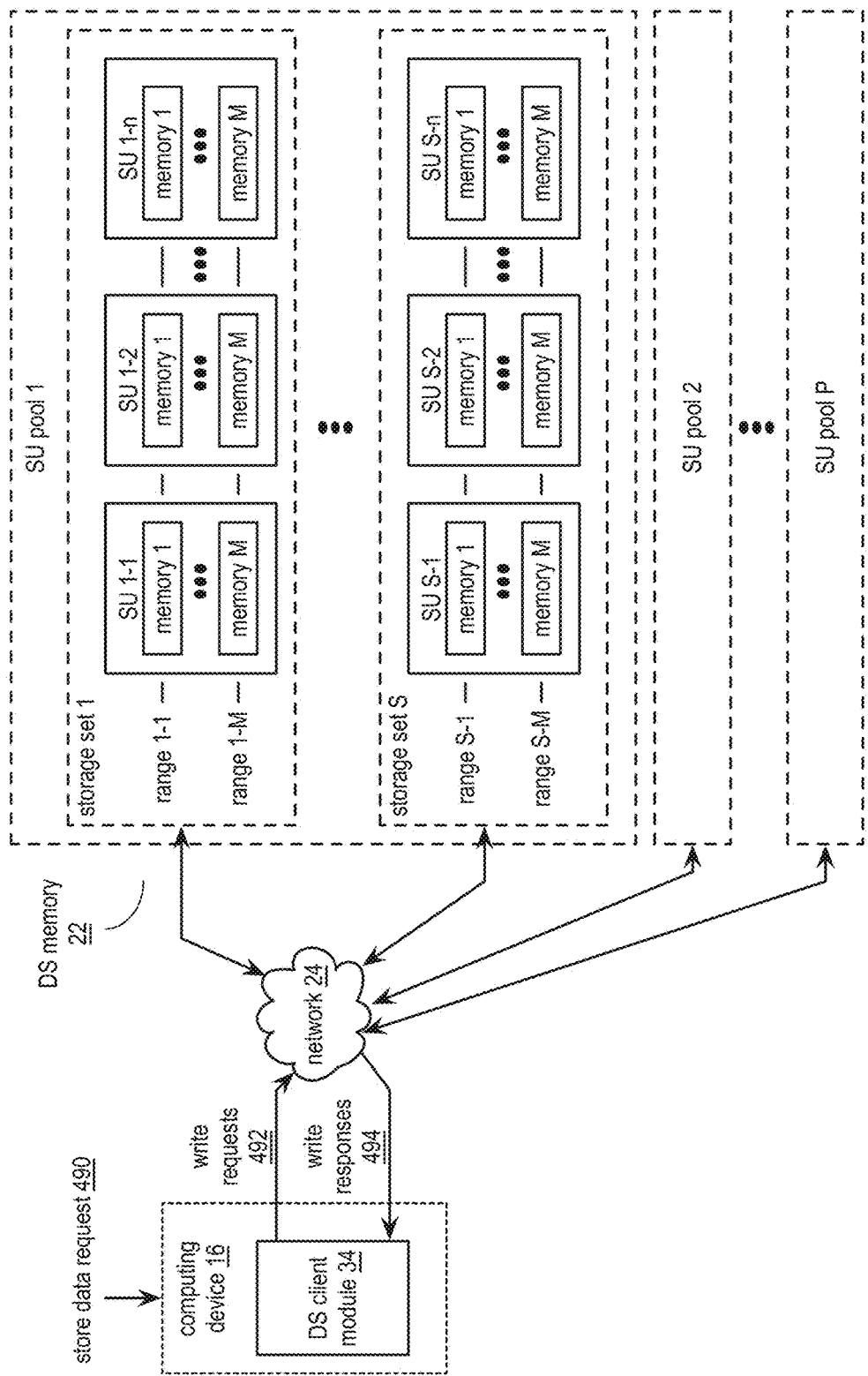
FIG. 11A is a schematic block diagram of another embodiment of a dispersed storage network (DSN) in accordance with the present invention.

FIG. 11A is a schematic block diagram of another embodiment of a dispersed storage network (DSN) that includes the distributed storage (DS) processing unit 16 of FIG. 1, the network 24 of FIG. 1, and the DSN memory 22 of FIG. 1. The computing device 16 includes the DS client module 34 of FIG. 1. The DSN memory 22 includes a plurality of storage unit pools 1-P. each storage unit pool includes one or more storage sets 1-S. Each storage set includes a set of storage units 1-n. Each storage unit includes a plurality of memories 1-M. Each storage unit may be implemented utilizing the storage unit 36 of FIG. 1. Each memory of each storage set is associated with a DSN address range 1-M (e.g., range of slice names).

The DSN functions to store data in the DSN memory 22. In an example of operation of the storing of the data, the computing device 16 receives a store data request 490. The store data request 490 includes one or more of a data object, a data object name, and a requester identity. Having received the store data request 490, the DS client module 34 identifies a storage pool associated with the store data request. The identifying includes at least one of performing a vault lookup based on the requester identity, performing a random selection, selecting based on available storage set storage capacity, and selecting based on storage set performance levels.

Having identified the storage pool, the DS client module 34 generates a DSN address, where the DSN address falls within an address range associated with a plurality of storage sets, where each storage set is associated with a plurality of address ranges, and where each address range is associated with a set of memories. For example, the DS client module 34 generates the DSN address based on a random number to produce an available DSN address within a plurality of address ranges of the identified storage pool read as another example, the DS client module 34 generates the DSN address based on memory said attributes such as performance and available capacity.

Having generated the DSN address, the DS client module 34 initiates storage of the data at the DSN address. For example, the DS client module 34 dispersed storage error encodes the data to produce a plurality of sets of encoded data slices and issues, via the network 24, one or more sets of write slice requests as write requests 492 that includes the plurality of sets of encoded data slices to be storage units associated with the DSN address. Having issued the write requests 492, the DS client module 34 receives write responses 494 from at least some of the storage units.

When an unfavorable condition is detected with regards to storage of the data at the DSN address (e.g., less than a write threshold number of favorable write responses have been received), the DS client module 34 generates another DSN address, where the other DSN address is associated with another set of memories (e.g., of the same set of storage units or from another set).

Having generated the other DSN address, the DS client module 34 facilitates storage of the data at the other DSN address. For example, the DS client module 34 resends the one or more sets of write slice requests 492 to a set of storage units associated with other set of memories. Having resent the one or more sets of write slice requests 492, the DS client module 34 may also update a DSN directory or equivalent to associate the data object name and the other DSN address.

Figure 11B:
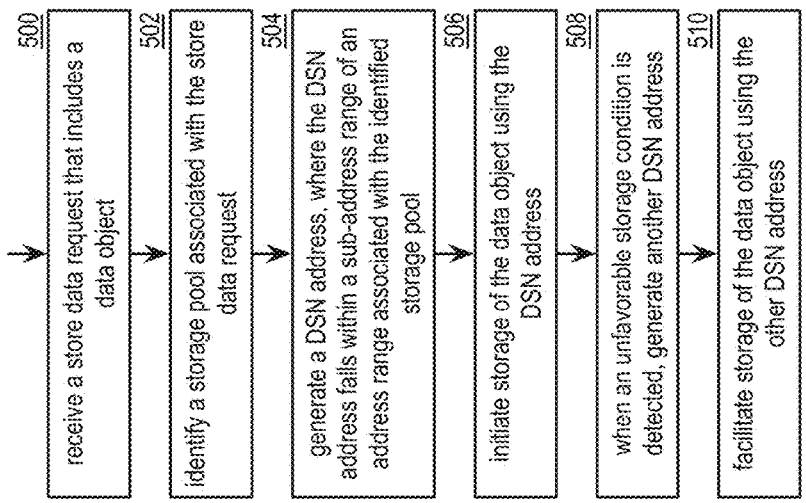
FIG. 11B is a flowchart illustrating another example of storing data in accordance with the present invention.

FIG. 11B is a flowchart illustrating another example of storing data. The method begins or continues at step 500 where a processing module (e.g., of a distributed storage (DS) client module) receives a store data request that includes a data object. The receiving may include receiving a requester identity and a data object name. The method continues at step 502 where the processing module identifies a storage pool associated with the store data request. The identifying may include one or more of interpreting system registry information, interpreting a vault entry associated with the requester identifier, performing a random selection, selecting based on performance, and selecting based on available storage capacity.

The method continues at step 504 where the processing module generates a dispersed storage network (DSN) address, where the DSN address falls within a sub-address range of an address range associated with the identified storage pool. The generating may include at least one of generating a random address within the address range of the identified storage pool (e.g., to include a vault identifier and a random object number), selecting a next available DSN address, and selecting a DSN address associated with a set of memories associated with favorable performance and storage capacity.

The method continues at step 506 where the processing module initiates storage of the data object using the DSN address. For example, the processing module dispersed storage error encodes the data object to produce a plurality of sets of encoded data slices, generates a plurality of sets of slice names that includes the DSN address (e.g., include a slice index, and a segment number along with the vault identifier and the random object number), generates one or more sets of write slice requests that includes the plurality of sets of encoded data slices and the plurality of sets of slice names, and sends the one or more sets of write slice requests to a storage set associated with the DSN address.

When an unfavorable storage condition is detected, the method continues at step 508 where the processing module generates another DSN address. For example, the processing module detects the unfavorable storage condition (e.g., a time frame expires without receiving a write threshold number of favorable write slice responses), identifies a set of memories associated with the DSN address, selects another set of memories associated with favorable performance and available capacity, and generates a DSN address associated with the other set of memories as the other DSN address.

The method continues at step 510 where the processing module facilitates storage of the data object using the other DSN address. For example, the processing module issues write slice requests to storage units associated with the other set of memories, where the write slice requests includes the plurality of sets of encoded data slices. When receiving favorable write slice responses, the processing module associates the data object name and the other DSN address. For example, the processing module updates a DSN directory. As another example, the processing module updates a dispersed hierarchical index.

Figure 12A:
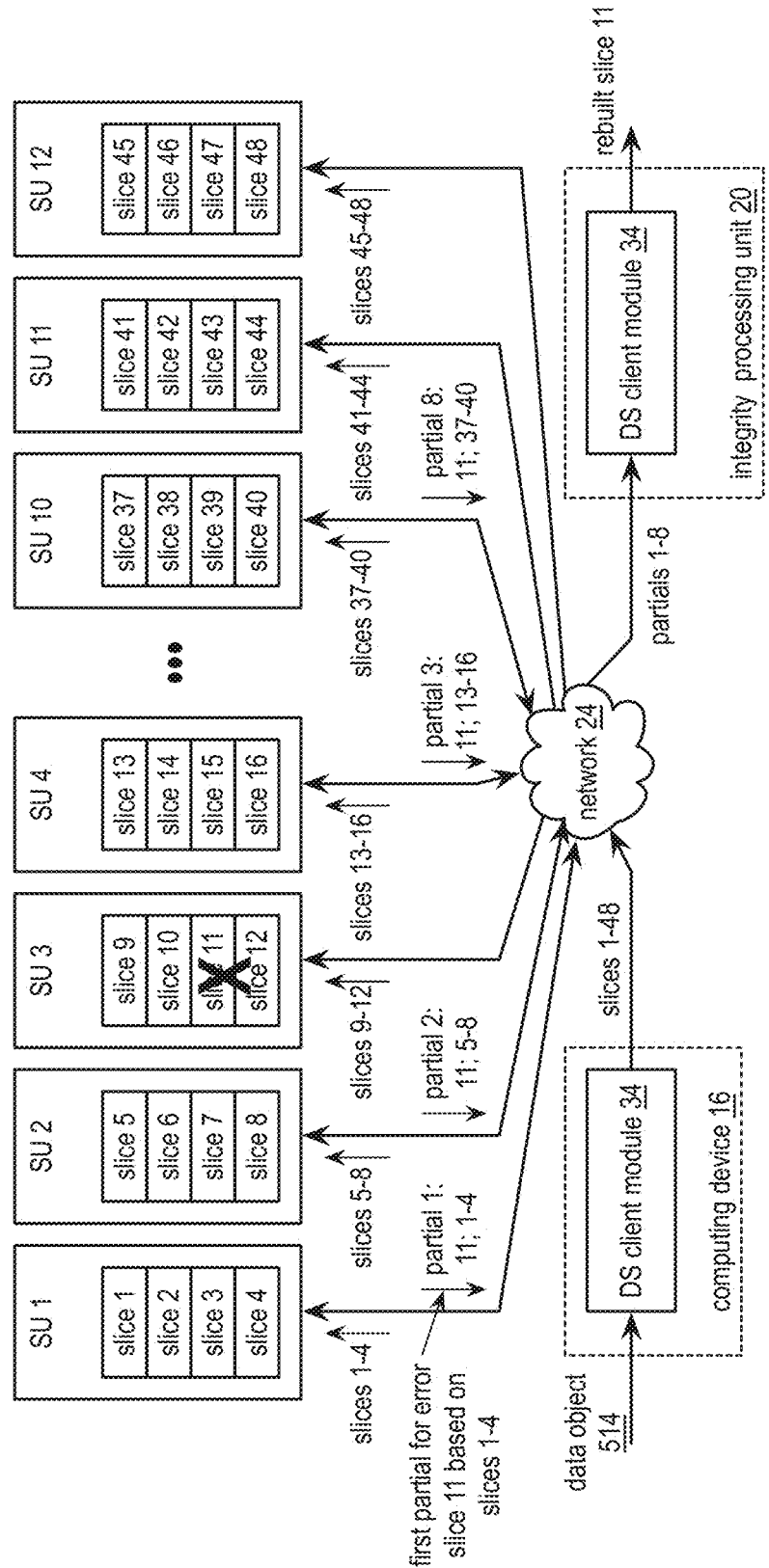
FIG. 12A is a schematic block diagram of another embodiment of a dispersed storage network (DSN) in accordance with the present invention.

FIG. 12A is a schematic block diagram of another embodiment of a dispersed storage network (DSN) that includes a set of distributed storage (DS) execution (EX) units 1-12, the network 24 of FIG. 1, the computing device 16 of FIG. 1, and the integrity processing unit 20 of FIG. 1. Each storage unit may be implemented utilizing the storage unit 36 of FIG. 1. The computing device 16 includes the DS client module 34 of FIG. 1. The integrity processing unit 20 includes the DS client module 34 of FIG. 1. Alternatively, the DS client module 34 may be implemented in one or more of the storage units 1-12.

The DSN is operable to rebuild stored data when a storage error associated with an error slice has been detected. In an example of operation of the rebuilding of the stored data, the computing device 16 divides a data object 514 into a plurality of data segments, dispersed storage error encodes each data segment to produce a set of encoded data slices that includes an information dispersal algorithm (IDA) width number of encoded data slices, where the IDA width is at least twice a number of storage units of the set of storage units. As such, two or more encoded data slices of each set of encoded data slices are stored in each storage unit of the set of storage units. For example, for encoded data slices are stored, via the network 24, in each of the set of storage units 1-12 when the IDA width is 48. Having generated the encoded data slices, the computing device facilitates storage of each set of encoded data slices in the set of storage units, where at least two encoded data slices are stored in each storage unit (e.g., stored in one or more memories within each storage unit).

When detecting the storage error of the error slice, the integrity processing unit 20 requests, via the network 24, a partial threshold number of partial encoded data slices for selected slices of the set of encoded data slices that includes the error slice (e.g., encoded data slice to be rebuilt). For example, the integrity processing unit 20 requests 8 partial encoded data slices from eight storage units, where the eight partial encoded data slices are based on 32 stored encoded data slices of the set of 48 encoded data slices when the decode threshold number is 32 when detecting that the encoded data slice 11 is the error slice. As such, each of the partial encoded data slices is based on four stored encoded data slices within a particular storage unit.

Each storage unit receiving a partial encoded data slice request performs a partial encoding function on each available encoded data slice of the selected slices of the set of encoded data slices within the storage unit to produce one of the partial encoded data slices of the requested partial threshold number of partial encoded data slices. For example, the storage unit 1 obtains an encoding matrix utilized to generate the encoded data slice 11 to be rebuilt, reduces the encoding matrix to produce a square matrix that exclusively includes rows associated with the decode threshold number of selected slices, inverts the square matrix to produce an inverted matrix, matrix multiplies the inverted matrix by an encoded data slice associated with the computing device unit to produce a vector, and matrix multiplies the vector by a row of the encoding matrix corresponding to the encoded data slice 11 to be rebuilt to produce the partial encoded data slice for the selected slice.

Having produced the partial encoded data slices for the selected slices, each storage unit that receives the partial encoded data slice request combines the partial encoded data slices of the storage unit to produce a single partial encoded data slice response for transmission, via the network 24, to the integrity processing unit 20. For example, the storage unit 1 adds the partial encoded data slices in the field under which the IDA arithmetic is implemented (e.g., exclusive OR) to produce partial encoded data slice 1 for error slice 11 based on encoded data slices 1-4. Having produced the single partial encoded data slice response, the storage units send, via the network 24, the single partial encoded data slice response to the integrity processing unit 20.

The integrity processing unit 20 receives the partial threshold number of partial encoded data slices 1-8 and combines the received partial encoded data slices to produce a rebuilt encoded data slice for the error slice. For example, the integrity processing unit 20 adds the received partial encoded data slices 1-8 in the field under which the IDA arithmetic is implemented. Having produced the rebuilt encoded data slice 11, the integrity processing unit 20 facilitates overwriting of the error slice with the rebuilt encoded data slice. For example, the integrity processing unit 20 issues, via the network 24, a write slice request to storage unit 3, where the write slice request includes the rebuilt encoded data slice for error slice 11.

Figure 12B:
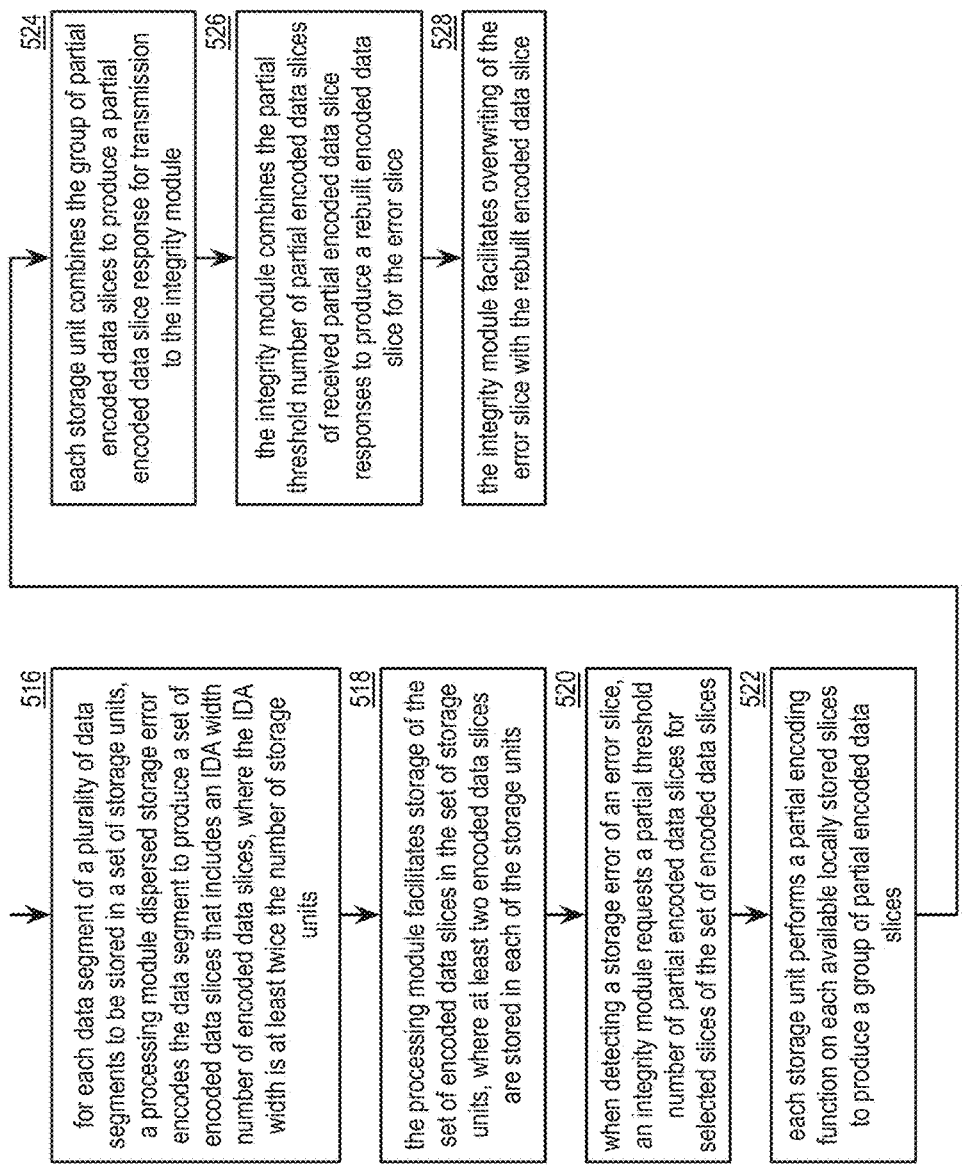
FIG. 12B is a flowchart illustrating an example of rebuilding stored data in accordance with the present invention.

FIG. 12B is a flowchart illustrating an example of rebuilding stored data. The method begins or continues at step 516 where a processing module (e.g., of a distributed storage (DS) client module), for each data segment of a plurality of data segments to be stored in a set of storage units, dispersed storage error encodes the data segment to produce a set of encoded data slices that includes an information dispersal algorithm (IDA) width number of encoded data slices, where the IDA width is at least twice the number of storage units.

The method continues at step 518 where the processing module facilitates storage of the set of encoded data slices in the set of storage units, where at least two encoded data slices are stored in each of the storage units. For example, the processing module issues a write slice requests to the storage units, where the storage unit stores the encoded data slices in one or more memories.

When detecting a storage error of an error slice, the method continues at step 520 where and integrity module requests a partial threshold number of partial and encoded data slices for selected slices of the set of encoded data slices. The detecting includes one or more of interpreting an error message, scanning slices, and detecting the error when a slice is missing or corrupted. The requesting includes issuing partial slice requests indicating the identity of the error slice and selected slices of the rebuilding process. The partial slice request may further include a rebuilding matrix.

The method continues at step 522 where each storage unit performs a partial encoding function on each available locally stored slices to produce a group of partial encoded data slices. For example, the storage unit performs a partial encoding function based on the slice to be rebuilt, the rebuilding matrix, and one or more locally stored slices. The rebuilding matrix is based on the selected slices for the rebuilding process (e.g., includes rows of an encoding matrix associated with the selected slices for the rebuilding process, where the selected slices includes a decode threshold number of slices).

The method continues at step 524 where each storage unit combines the group of partial encoded data slices to produce a partial encoded data slice response for transmission to the integrity module. For example, the storage unit adds the partial encoded data slices in a field under which the IDA arithmetic was implemented.

The method continues at step 526 where the integrity module combines the partial threshold number of partial encoded data slices of received partial encoded data slice responses to produce a rebuilt encoded data slice for the error slice. For example, the integrity module adds the received partial encoded data slices in the field under which the IDA arithmetic was implemented.

The method continues at step 528 where the integrity module facilitates overwriting of the error slice with the rebuilt encoded data slice. For example, the integrity module issues a write slice request to a storage unit associated with the error slice, where the write slice request includes the rebuilt encoded data slice.

Figure 13A:
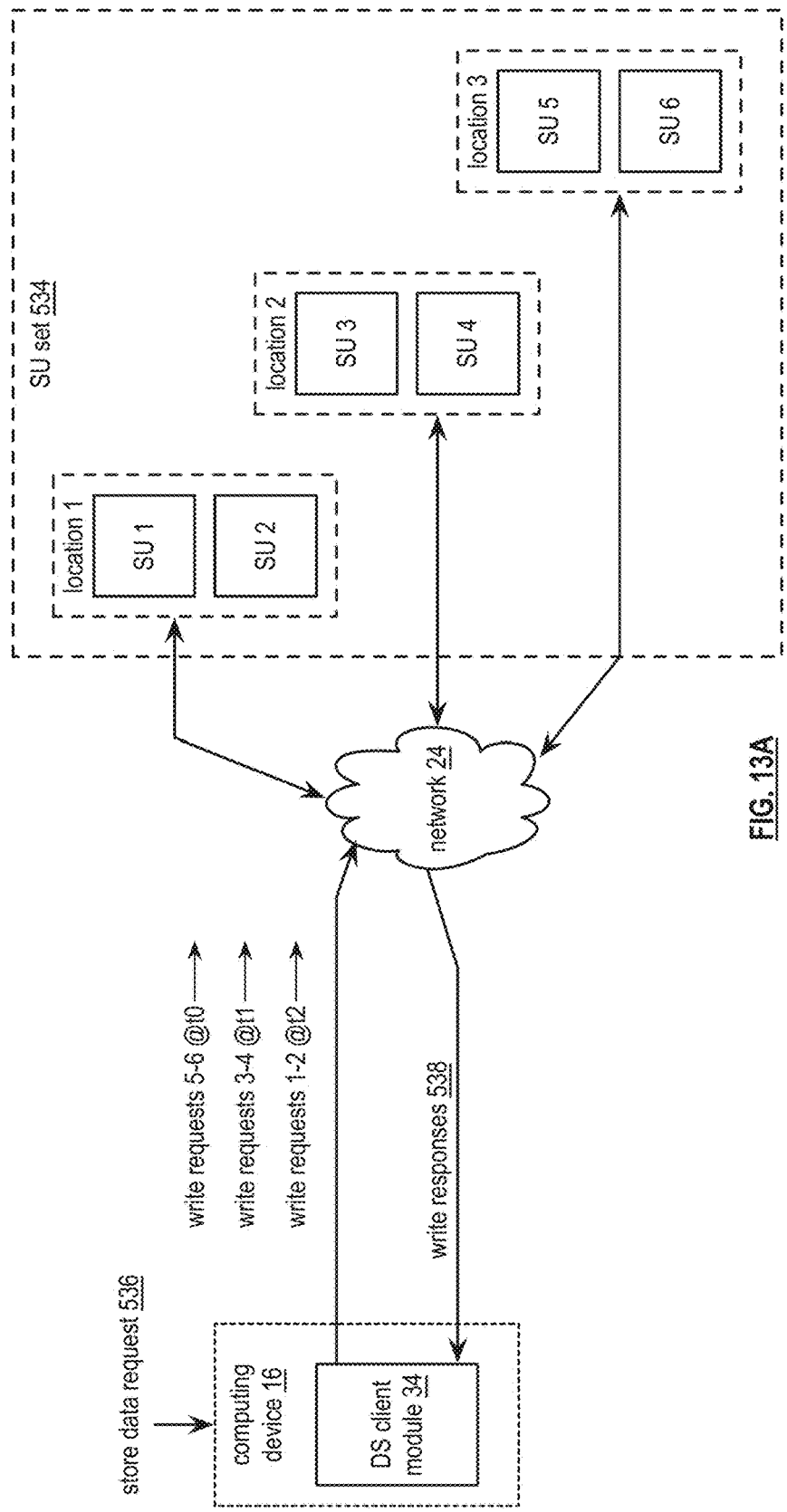
FIG. 13A is a schematic block diagram of another embodiment of a dispersed storage network (DSN) in accordance with the present invention.

FIG. 13A is a schematic block diagram of another embodiment of a dispersed storage network (DSN) that includes the distributed storage (DS) processing unit 16 of FIG. 1, the network 24 of FIG. 1, and a storage unit set 534. The computing device 16 includes the DS client module 34 of FIG. 1. The storage unit set 534 includes a plurality of locations 1-3, where each location includes at least one storage unit. Each storage unit may be implemented utilizing the storage unit 36 of FIG. 1. For example, the location 1 includes storage units 1-2, the location 2 includes storage units 3-4, and the location 3 includes storage units 5-6.

The plurality of locations are established at different distances from the computing device 16, such that messages sent by the computing device 16, via the network 24, arrive at different times at the different locations. For instance, messages sent from the computing device 16 via the network 24 to the storage units at the location 1 incur a 20 ms delay, messages sent from the computing device 16 via the network 24 to the storage units at the location 2 incur a 30 ms delay, and messages sent from the computing device 16 via the network 24 to the storage units at the location 3 incur a 40 ms delay.

The DSN is operable to store data as sets of encoded data slices in the storage unit set. In an example of operation of the storing of the data, the computing device 16 receives a store data request 536, where the store data request 536 includes one or more of a data object, a data object name, and a requester identifier (ID). Having received the store data request 536, the DS client module 34 identifies the storage unit set that is associated with the store data request 536. The identifying includes at least one of performing a vault lookup based on the requester ID, performing a random selection, and selecting based on available storage capacity.

Having identified the storage unit set, the DS client module 34 dispersed storage error encodes the data object to produce a plurality of sets of encoded data slices. Having generated the encoded data slices, the DS client module 34 generates one or more sets of write slice requests that includes the one or more sets of encoded data slices of the plurality of sets of encoded data slices.

For each set of write slice requests, the DS client module 34 determines a transmission schedule such that the set of write slice requests arrives at the plurality of locations at substantially the same timeframe. For example, the DS client module 34 obtains estimated transmission times to each storage unit, identifies a long as transmission time, and establishes a time delay for each storage unit as a difference between the long as transmission time and the estimated transmission time associated with the storage unit, where the delay time is an amount of time to wait before sending the right slice request to the storage unit after sending a first write slice request to a storage unit associated with the long as transmission time.

Having determined the transmission schedule for each read slice request, a DS client module 34 sends, via the network 24, each write slice request in accordance with the transmission schedule. For example, the DS client module 34 sends, at a beginning time zero, write slice requests 5-6 to storage units 5-6 at location 3, sends, at a time 1 (e.g., first time delay), write slice requests 3-4 to the storage units 3-4 at location 2, and sends, at a time 2, write slice requests 1-2 to the storage units 1-2 and location 1.

Having sent the write slice requests, the DS client module 34 receives write slice responses as write responses 538 from at least some of the storage units. The DS client module 34 processes the store data request based on the received write slice responses. For example, the DS client module 34 indicates successful storage when receiving a write threshold number of favorable write slice responses within a time frame. As another example, the DS client module 34 retries the writing process when not receiving the write threshold number of favorable write slice responses within the timeframe (e.g., another DS client module 34 has temporarily locked slice names of the writing process in a write conflict scenario).

Figure 13B:
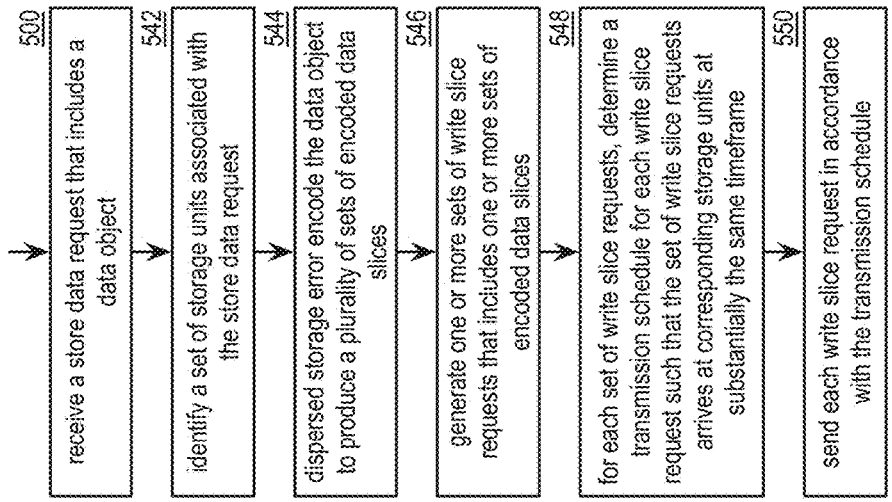
FIG. 13B is a flowchart illustrating another example of storing data in accordance with the present invention.

FIG. 13B is a flowchart illustrating another example of storing data, which include similar steps as FIG. 44B. The method begins with step 500 of FIG. 44B where a processing module (e.g., of a distributed storage (DS) client module) receives a store data request that includes a data object. The method continues at step 542 where the processing module identifies a set of storage units associated with the store data request. The identifying includes at least one of interpreting a vault lookup based on a requester identifier, performing a random selection, performing a selection based on available storage capacity, performing a selection based on performance, and performing a selection based on transmission time delays to each storage unit of the set of storage units.

The method continues at step 544 where the processing module dispersed storage error encodes the data object to produce a plurality of sets of encoded data slices. The processing module may further generate a plurality of sets of slice names corresponding to the plurality of sets of encoded data slices. The method continues at step 546 where the processing module generates one or more sets of write slice requests that include one or more sets of encoded data slices. For example, the processing module generates a write slice request for each storage unit of the set of storage units, where each read slice request includes encoded data slices associated with the storage unit and slice names associated with the encoded data slices.

For each set of write slice requests, the method continues at step 548 where the processing module determines a transmission schedule for each write slice request such that the set of write slice requests arrives at corresponding storage units at substantially the same timeframe. For example, for each storage unit, the processing module obtains an estimated transmission time (e.g., a lookup, initiating a test, interpreting test results), identifies a longest transmission time, and establishes a time delay for each storage unit as a difference between the longest transmission time and the estimated transmission time of the storage unit.

The method continues at step 550 where the processing module sends each write slice request in accordance with the transmission schedule. For example, the processing module sends a write slice request associated with a storage unit of the longest transmission time first, and initiates timing such that the processing module sends success of write slice requests based on the time delays of the transmission schedule. Alternatively, or in addition to, upon detecting a storage failure (e.g., when a timeframe elapses without receiving a read threshold number of favorable write slice responses), the processing module recalculates the transmission scheduled to vary the delay times and we sends write slice requests in accordance with the varied delay times.

Figure 14A:
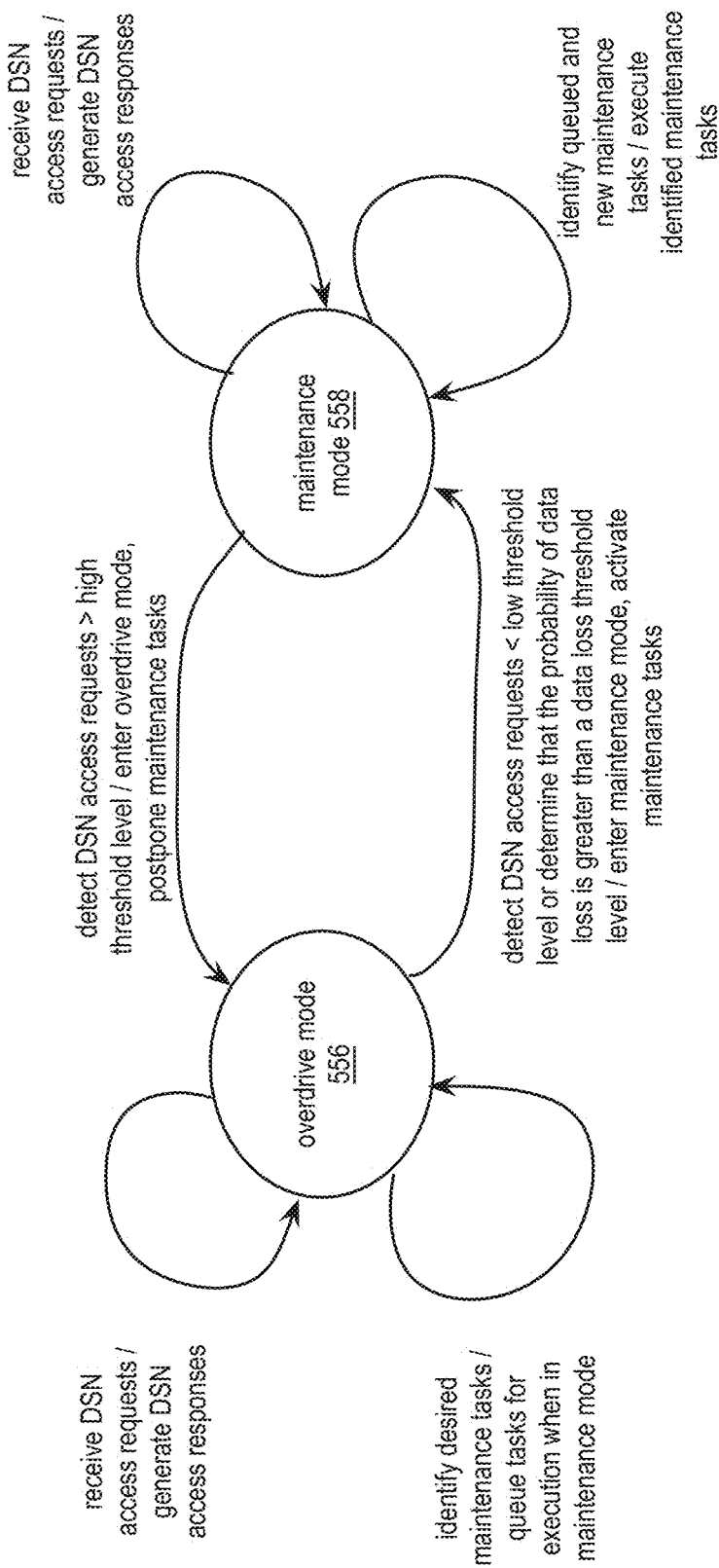
FIG. 14A is a state transition diagram of modes of operation of a dispersed storage network (DSN) in accordance with the present invention.

FIG. 14A is a state transition diagram of modes of operation of a dispersed storage network (DSN) that includes two states, an overdrive mode state 556 and a maintenance mode state 558. While operating in the maintenance mode 558, the DSN processes both data access tasks and maintenance tasks. The maintenance tasks include one or more of rebuilding, migration, disk balancing, recording statistics, recording debugging information, and other non-essential data access performance-degrading operations. The data access tasks includes one or more of storing data, retrieving data, deleting data, and listing store data. For example, one or more processing modules of the DSN identifies queued and new maintenance tasks and executes the identified maintenance tasks while in the maintenance mode. As another example, the one or more processing modules of the DSN receives DSN access requests and generates DSN access responses.

While operating in the overdrive mode 556, the DSN processes the data access requests but holds the maintenance tasks. As such, a backlog of further maintenance tasks may grow in size while the DSN is in the overdrive mode. For example, the one or more processing modules of the DSN receives DSN access requests and generates DSN access responses. As another example, the one or more processing modules of the DSN identifies desired maintenance tasks and queues the tasks for execution when the DSN returns to the maintenance mode.

The DSN may transition back and forth between the overdrive mode 556 and the maintenance mode 558 from time to time based on one or more of a level of data access requests (e.g., store data request per unit time, retrieve data request per unit of time) and a probability of data loss (e.g., probability of unrecoverable data when less than a decode threshold number of encoded data slices per set of encoded data slices is available as a result of deferring rebuilding operations etc). As a specific example, while in the maintenance mode 558, the one or more processing modules transitions the DSN from the maintenance mode 558 to the overdrive mode 556 and postpones maintenance tasks when detecting that a level of DSN access requests is greater than a high threshold level. As another specific example, while in the overdrive mode 556, the one or more processing modules transitions the DSN from the overdrive mode 556 to the maintenance mode 558 and activates maintenance tasks when detecting that the level of DSN access requests is less than a low threshold level. As yet another specific example, while in the overdrive mode 556, and the one or more processing modules transitions the DSN from the overdrive mode 556 to the maintenance mode 558 and activates maintenance tasks when determining that the probability of data loss is greater than a data loss threshold level. For instance, the one or more processing modules detects that memory devices are almost full due to lack of rebalancing operations. In another instance, the one or more processing modules detects that a number of available slices per set of encoded data slices is less than a low threshold level due to postponement of rebuilding operations.

Figure 14B:
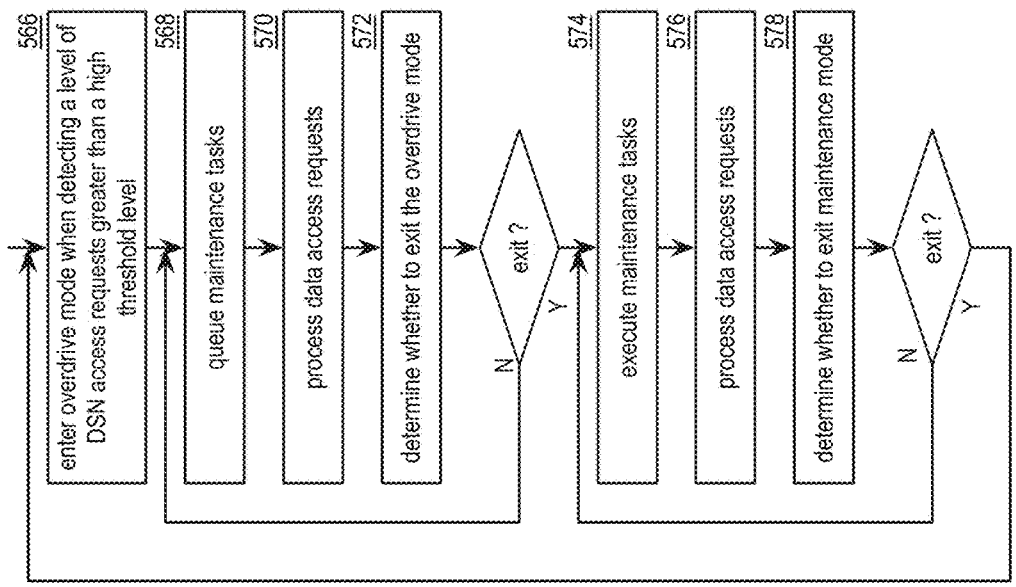
FIG. 14B is a flowchart illustrating an example of determining a mode of operation of a dispersed storage network (DSN) in accordance with the present invention.

FIG. 14B is a flowchart illustrating an example of determining a mode of operation of a dispersed storage network (DSN). The method begins or continues at step 566 where a processing module (e.g., of a distributed storage (DS) client module) causes the DSN to enter an overdrive mode when detecting a level of DSN access requests are greater than a high threshold level. The method continues at step 568 where the processing module queues maintenance tasks. For instance, the processing module receives a new maintenance task request and enters the maintenance task request in a dispersed hierarchical index serving as a queue for maintenance tasks.

The method continues at step 570 where the processing module processes data access request. For example, the processing module prioritizes writing new data DSN memory ahead of reading data from the DSN memory. The method continues at step 572 where the processing module determines whether to accept the overdrive mode. For example, the processing module indicates to exit when detecting that the level of DSN access requests is less than a low threshold level. As another example, the processing module indicates to exit when detecting that a probability of data loss is greater than a data loss threshold level. The method loops back to step 568 when the processing module determines not to exit the overdrive mode. The method continues to step 574 when the processing module determines to exit the overdrive mode.

The method continues at step 574 where the processing module executes maintenance tasks. For example, the processing module retrieves queued maintenance tasks from the maintenance task queue and executes the maintenance tasks. The method continues at step 576 where the processing module processes data access requests. For example, the processing module prioritizes the writing of data and the reading of data equally (e.g., first in first out prioritization).

The method continues at step 578 where the processing module determines whether to exit the maintenance mode. For example, the processing module indicates to exit when detecting that the level of data access requests is greater than a high threshold level. The method loops back to step 574 when the processing module determines not to exit the maintenance mode. The method loops back to step 566 when the processing module determines to exit the maintenance mode.

Figure 15A:
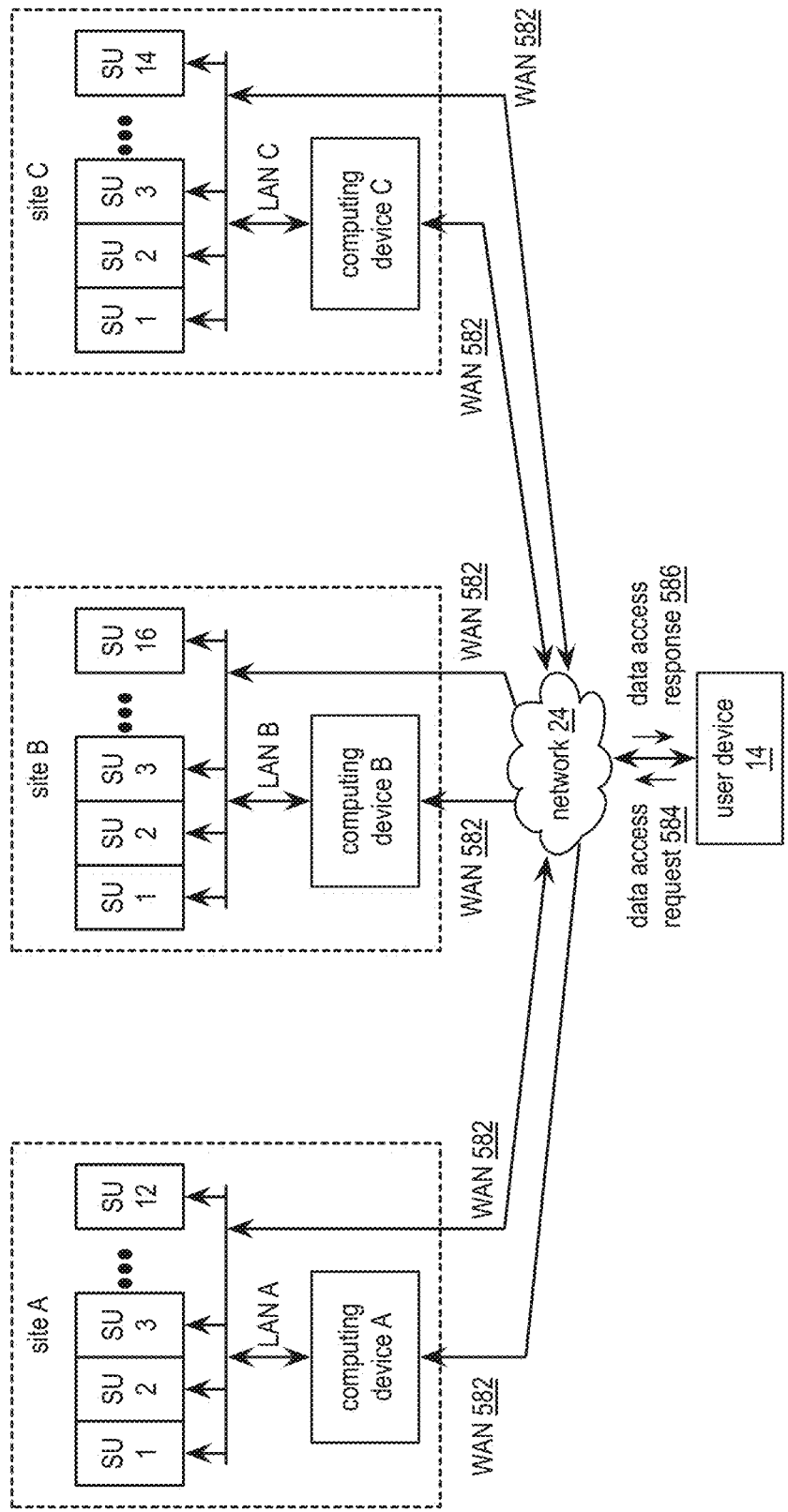
FIG. 15A is a schematic block diagram of another embodiment of a dispersed storage network (DSN) in accordance with the present invention.

FIG. 15A is a schematic block diagram of another embodiment of a dispersed storage network (DSN) that includes three sites A-C, the network 24 of FIG. 1, and the user device 14 of FIG. 1. Each site includes a plurality of storage units, a local area network (LAN), and a distributed storage (DS) processing unit. A number of storage units per site may vary. For example site A includes 12 storage units, site B include 16 storage units, and site C includes 14 storage units. Each storage unit may be implemented utilizing the storage unit 36 of FIG. 1. Each computing device may be implemented utilizing the computing device 16 of FIG. 1. Each site is operably connected to the network 24 via a wide area network (WAN) 582.

The DSN is operable to enable the user device 14 to access data stored as sets of encoded data slices in storage units of the plurality of sites. In an example of operation of accessing the data, at least one of the computing device receives, via the network 24, a data access request 584 (e.g., store data request, a retrieve data request) from the user device 14. For instance, computing device A receives the data access request 584. Having received the data access request 584, the computing device selects a number of storage units at each site to support the data access request 584. For example, the computing device selects the number of storage units based on one or more of storage unit availability, storage unit performance levels, a predetermination, and interpreting a system registry. For instance, the computing device selects all storage units at all sites (e.g., 12 storage units at site A, 16 storage units at site B, and 14 storage units at site C).

Having selected the number of storage units at each site, the computing device 16 selects a computing device of the plurality of computing devices to process the data access request further, where the selection is based on the number of storage units at each site to support the data access request. For example, the computing device A selects the computing device B to process the data access request further when the 16 storage units selected at site B is greater than the number of storage units selected at sites A and C. Alternatively, or in addition to, the computing device may select the computing device to process the data access request based on one or more of available computing device processing capacity and expected wide area network traffic through the network 24.

Having selected the computing device to process the data access request further, the selected computing device processes the data access request 584. For example, the computing device B receives the data access request 584 from the computing device A, accesses the storage units 1-16 at the site B via the LAN B, accesses the storage units 1-12 at the site A via the network 24 and WAN messaging, accesses the storage units 1-14 at the site C via the network 24 and the WAN messaging, and issues, via the network 24, a data access response 586 to the user device 14 based on the accessing of the storage units.

Figure 15B:
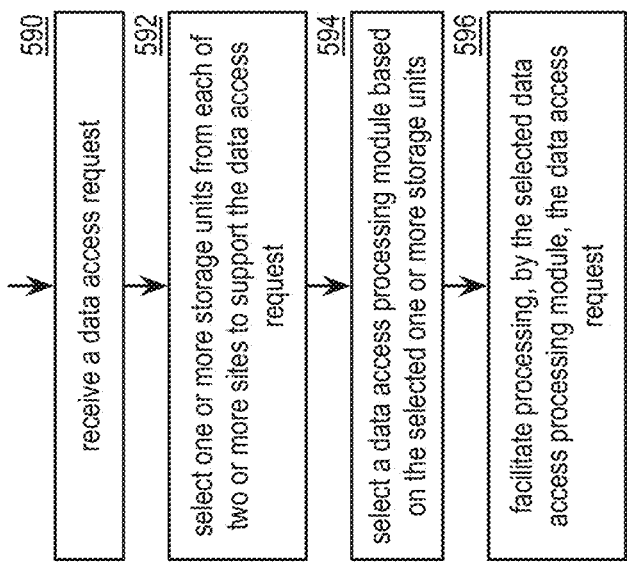
FIG. 15B is a flowchart illustrating an example of accessing data in a dispersed storage network (DSN) in accordance with the present invention.

FIG. 15B is a flowchart illustrating an example of accessing data in a dispersed storage network (DSN). The method begins or continues at step 590 where a processing module (e.g., of a receiving distributed storage (DS) processing unit) receives a data access request. The data access request may be received by any one of a plurality of processing modules of the DSN. The data access request may include one or more of a store data request with a data object and a retrieve data request.

The method continues at step 592 where the processing module selects one or more storage units from each of two or more sites of the DSN to support the data access request. The selecting may be based on one or more of storage unit availability, storage unit performance levels, a predetermination, and interpreting a system registry. For example, the processing module selects the storage units based on a system registry lookup, where a portion of the system registry is accessed based on a requesting entity identifier associated with the data access request.

The method continues at step 594 where the processing module selects a data access processing module based on the selected one or more storage units. For example, the processing module selects a data access module associated with a highest number of storage units of the selected one or more storage units at a common site. The method continues at step 596 where the selected data access processing module facilitates processing the data access request. For example, the processing module transfers the data access request to the data access processing module when the selected data access processing module does not possess the data access request, the selected data access processing module issues slice access requests to local storage units and remote storage units, the selected data access processing module receives slice access responses, and the selected data access processing module issues a data access response based on the received slice access responses.

FIG. 16A is a schematic block diagram of another embodiment of a dispersed storage network (DSN) that includes sites 1-2, the network 24 of FIG. 1, and the distributed storage (DS) processing unit 16 of FIG. 1. Each site includes a plurality of storage units such that at least a decode threshold number of storage units are implemented at each site and an information dispersal algorithm (IDA) width of an IDA utilized to encode data for storage is at least twice the decode threshold number. For instance, each site includes nine storage units when the decode threshold is 8, a read threshold is 8, and the IDA width is 18.

The DSN is operable to store data assets of encoded data slices. In an example of operation of the storing of the data, the computing device 16 receives a store data request 600, where the store data request 600 includes a data object and a desired consistency level. The desired consistency level includes at least one of a strong consistency level and a weak consistency level. A strong consistency level is associated with guaranteeing that a subsequent reader will see a latest revision of the data when a strong write threshold plus the read threshold is greater than the IDA width. As such, subsequent reads and writes are forced overlap which may expose conflicting revisions while exposing the latest revision.

Having received the store data request 600, the computing device 16 dispersed storage error encodes the data object to produce a plurality of sets of encoded data slices, where each set includes an IDA width number of encoded data slices, and where at least a decode threshold number of encoded data slices per set are required to reconstruct the data object. Having produced the encoded data slices, the computing device 16 selects a write threshold number based on one or more of the desired consistency level, interpreting a system registry value, and storage unit performance levels. For example, the computing device 16 selects a write threshold of 11, such that 11 plus 8>18, when the strong write threshold is required to support the strong consistency level. As another example, the computing device 16 selects a write threshold of 9 when the weak write threshold is required (9+8 is not greater than 18).

Having selected the read threshold number, the computing device 16 issues one or more sets of write slice requests as slice access 602 to the storage units, where the write slice requests includes the plurality of sets of encoded data slices. The computing device 16 receives write slice responses as further slice access 602 from at least some of the storage units. Having received the write slice responses, the computing device 16 determines whether a favorable number of write slice responses have been received within a time frame. For example, the computing device 16 indicates a favorable number of write slice responses when the strong write threshold number of write slice responses have been received. As another example, the c computing device 16 indicates that the favorable number of write slice responses has not been received when the strong write threshold number of write slice responses has not been received and the write threshold is the strong write threshold number. As yet another example, the computing device 16 indicates that the favorable number of write slice responses has been received when the week write threshold number of write slice responses has been received and the write threshold number includes the weak write threshold number.

When the favorable number has not been received, computing device 16 issues one or more sets of rollback requests as further slice access 602 to at least some of the storage units to rollback initiation of storing of the data object. When the favorable number has been received, the computing device 16 issues one or more sets of finalize requests as still further slice access 602 to the at least some of the storage units to complete the storing of the data object. Having sent either of the rollback requests or the finalize requests to the least some of the storage units, the computing device 16 issues a store data response 604 to a requesting entity, where the store data response 604 includes a status associated with storage of the data object. For example, the status indicates which level of consistency was met when the data object was stored.

FIG. 16B is a flowchart illustrating another example of storing data. The method begins or continues at step 610 where a processing module (e.g., of a distributed storage (DS) processing unit) receives a store data request. The store data request may include one or more of a data object and a desired consistency level indicator. The method continues at step 612 where the processing module dispersed storage error encodes the data object to produce a plurality of sets of encoded data slices.

The method continues at step 614 where the processing module selects a write threshold number based on a desired consistency level. Alternatively, or in addition to, the processing module establishes the write threshold number based on one or more of the desired consistency level, a system registry value, and storage unit performance levels.

The method continues at step 616 where the processing module issues one or more sets of write slice requests to a set of storage units, where the one or more sets of write slice requests includes the plurality of sets of encoded data slices. The method continues at step 618 where the processing module receives write slice responses from at least some of the storage units. The write slice responses indicates a status of writing individuals slices to individual storage units, where the status includes at least one of successfully stored or error.

The method continues at step 620 where the processing module determines whether a favorable number of write slice responses has been received. For example, the processing module indicates favorable when at least the write threshold number of write slice responses has then received within a time frame. The method branches to step 624 when the favorable number of write slice responses has been received. The method continues to step 622 when the favorable number of write slice responses has not been received.

The method continues at step 622 where the processing module issues one or more sets of rollback requests to at least some of the storage units when the favorable number of write slice responses has not been received. The method branches to step 626 where the processing module issues a store data response. The method continues at step 624 where the processing module issues one or more sets of finalize requests to at least some of the storage units when the favorable number of write slice responses has been received. The method branches to step 626. The method continues at step 626 where the processing module issues a store data response. The issuing includes generating the store data response to include an indicator that indicates which level of consistency has been met.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc., described with reference to one or more of the embodiments discussed herein. Further, from figure to figure, the embodiments may incorporate the same or similarly named functions, steps, modules, etc., that may use the same or different reference numbers and, as such, the functions, steps, modules, etc., may be the same or similar functions, steps, modules, etc., or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A computing device comprising:
an interface configured to interface and communicate with a distributed storage network (DSN);
memory that stores operational instructions; and
processing circuitry operably coupled to the interface and to the memory, wherein the processing circuitry is configured to execute the operational instructions to:
receive a data access request to access a data object that is based on a set of encoded data slices (EDSs) that is distributedly stored among a plurality of storage units (SUs) associated with a plurality of storage sites, wherein a data object is segmented into a plurality of data segments, and wherein the data segment of the plurality of data segments is dispersed error encoded in accordance with dispersed error encoding parameters to produce a set of encoded data slices (EDSs);

select respective numbers of SUs at each of the plurality of storage sites to support the data access request;

based on the respective numbers of SUs at each of the plurality of storage sites, select a first computing device that is associated with a first storage site of the plurality of storage sites to process the data access request; and transmit the data access request to the first computing device to be processed by the first computing device.

2. The computing device of claim 1, wherein the data access request includes a consistency level indicator and further wherein the consistency level indicator includes information sufficient to determine a probability that a read data request can provide a most recent version of the data object.

3. The computing device of claim 1, wherein the plurality of storage sites includes a storage site with a number of SUs that is larger than the number of SUs for the other storage sites of the plurality of storage sites and further wherein the storage site is the first storage site.

4. The computing device of claim 1, wherein the respective numbers of SUs at each of the plurality of storage sites selected to support the data access request are selected based on at least one of a number of storage units available at each storage site, a performance level for one or more storage units at each storage site, a predetermination, and interpreting a DSN registry.

5. The computing device of claim 1, wherein the data access request is a store data request.

6. The computing device of claim 1, wherein the processing circuitry is further configured to execute the operational instructions to:

issue one or more write slice requests to the SUs at each of the plurality of storage sites; and receive one or more write slice responses from at least some of the SUs at each of the plurality of storage sites.

7. The computing device of claim 6, wherein the processing circuitry is further configured to execute the operational instructions to:

determine whether a favorable number of write slice responses have been received from SUs at each of the plurality of storage sites, and when a favorable number of write slice responses have been received from the plurality of SUs, issue a store data request to at least some of the SUs at each of the plurality of storage sites from which a favorable write slice response has been received.

8. The computing device of claim 7, wherein a favorable write slice response is a write slice response received within a predetermined time-frame.

9. A method for execution by one or more processing modules of one or more computing devices of a dispersed storage network (DSN), the method comprises:

receiving, by the one or more processing modules, a data access request to access a data object that is based on a set of encoded data slices (EDSs) that is distributedly stored among a plurality of storage units (SUs) associated with a plurality of storage sites, wherein a data object is segmented into a plurality of data segments, and wherein the data segment of the plurality of data segments is dispersed error encoded in accordance with dispersed error encoding parameters to produce a set of encoded data slices (EDSs);

selecting, by the one or more processing modules, respective numbers of SUs at each of the plurality of storage sites to support the data access request;

based on the respective numbers of SUs at each of the plurality of storage sites, selecting, by the one or more processing modules, a first computing device that is associated with a first storage site of the plurality of storage sites to process the data access request; and transmitting, by the one or more processing modules, the data access request to the first computing device to be processed by the first computing device.

10. The method of claim 9, wherein the data access request includes a consistency level indicator and further wherein the consistency level indicator includes information sufficient to determine a probability that a read data request can provide a most recent version of the data object.

11. The method of claim 9, wherein the plurality of storage sites includes a storage site of the plurality of storage sites with a number of SUs that is larger than the number of SUs for the other storage sites of the plurality of storage sites and further wherein the storage site is the first storage site.

12. The method of claim 9, wherein the respective numbers of SUs at each of the plurality of storage sites selected to support the data access request are selected based on at least one of a number of storage units available at each storage site, a performance level for one or more storage units at each storage site, a predetermination, and interpreting a DSN registry.

13. The method of claim 9, further comprising:

issuing one or more write slice requests to the SUs at each of the plurality of storage sites; and receiving one or more write slice responses from at least some of the SUs at each of the plurality of storage sites.

14. The method of claim 9, wherein the data access request is a store data request.

15. A first computing device comprising:

an interface configured to interface and communicate with a dispersed or distributed storage network (DSN);

memory that stores operational instructions; and processing circuitry operably coupled to the interface and to the memory, wherein the processing circuitry is configured to execute the operational instructions to:

receive a store data request, wherein the store data request includes a data object and a consistency level indicator;

select one or more storage units (SUs) from each of a plurality of storage sites to support the store data request;

select a second computing device associated with a storage site of the plurality of storage sites to process the store data request;

transmit the store data request to the storage site of the plurality to storage sites;

dispersed error encode, by the second computing device, the data object in accordance with dispersed error encoding parameters to produce a plurality of sets of encoded data slices (EDSs); and transmit, by the second computing device, one or more sets of EDSs of the plurality of sets of EDSs to a one or more storage sites of the plurality of storage sites.

16. The first computing device of claim 15, wherein the consistency level indicator includes information sufficient to determine a probability that a read data request can provide a most recent version of the data object.

17. The first computing device of claim 16, wherein the plurality of storage sites includes a storage site of the plurality of storage sites with a number of SUs that is larger than the number of SUs for the other storage sites of the plurality of storage sites and further wherein the storage site is associated with the second computing device.

18. The first computing device of claim 16, wherein the one or more storage units (SUs) from each of a plurality of storage sites selected to support the store data request are selected based on at least one of a number of storage units available at each storage site, a performance level for one or more storage units at each storage site, a predetermination, and interpreting a DSN registry.

19. The first computing device of claim 16, wherein the processing circuitry is further configured to execute the operational instructions to:
   issue one or more write slice requests to the SUs at each of the plurality of storage sites; and
   receive one or more write slice responses from at least some of the SUs at each of the plurality of storage sites.

\* \* \* \* \*